United States Patent [19]

Han et al.

[11] Patent Number: 6,091,727

[45] Date of Patent: Jul. 18, 2000

[54] METHODS FOR PERFORMING ORIGINATION AND TERMINATION PROCESSES TO CONTROL RESERVED SEMI-PERMANENT VIRTUAL PATH CONNECTIONS IN ASYNCHRONOUS TRANSFER MODE VIRTUAL PATH SWITCHING SYSTEM

[75] Inventors: Mi-Sook Han; Seung-Hee Kim; Han-Kyung Kim; Byung-Nam Yoon, all of Daejeon, Rep. of Korea

[73] Assignees: Electronics and Telecommunications Research Institute, Daejeon; Korea Telecommunication Authority, Seoul, both of Rep. of Korea

[21] Appl. No.: 08/770,200

[22] Filed: Dec. 19, 1996

[30] Foreign Application Priority Data

Dec. 26, 1995 [KR] Rep. of Korea ............ 95-56845

[51] Int. Cl.⁷ .................................................. H04L 12/28
[52] U.S. Cl. ...................... 370/395; 370/392; 370/397; 370/398
[58] Field of Search ..................... 370/389, 390, 370/392, 395, 397, 398, 399, 420, 439, 352, 356

[56] References Cited

U.S. PATENT DOCUMENTS

| | | | |
|---|---|---|---|
| 5,535,196 | 7/1996 | Aihara et al. | 370/60 |
| 5,771,231 | 6/1998 | Watanabe | 370/377 |
| 5,825,767 | 10/1998 | Mizukoshi et al. | 370/395 |
| 5,852,606 | 12/1998 | Prince et al. | 370/393 |

FOREIGN PATENT DOCUMENTS

| | | |
|---|---|---|
| 0 523386A1 | 1/1993 | European Pat. Off. . |
| 2 269724 | 2/1994 | United Kingdom . |

Primary Examiner—Brian Zimmerman
Assistant Examiner—Binyam Tadesse
Attorney, Agent, or Firm—Jacobson, Price, Holman & Stern, PLLC

[57] ABSTRACT

Methods for performing origination and termination processes to control reserved semi-permanent virtual path connections in an asynchronous transfer mode virtual path switching system. A service can flexibly be provided based on semi-permanent virtual path connection information for a desired time in response to a reserved semi-permanent virtual path registration command received through an operator interface during the operation of the system. Also, the reserved semi-permanent virtual path connections can be controlled up to 256 per subscriber link of 155 Mbps class. A subscriber service using time is designated and resources in a network are occupied only for the designated time. Therefore, a plurality of subscribers are set at different service time zones in such a manner that the network resources can be utilized at the maximum at each service time zone. The bidirectional-symmetrical, reserved semi-permanent virtual path is set between the subscribers interfaced through the subscriber link of 155 Mbps class, for the service provision for the designated time. Therefore, information such as a moving picture can be transferred through multimedia and virtual channel switches can be interconnected via virtual channels for the control of ATM subscribers in the future ATM network.

8 Claims, 16 Drawing Sheets

METHODS FOR PERFORMING ORIGINATION AND TERMINATION PROCESSES TO CONTROL RESERVED SEMI-PERMANENT VIRTUAL PATH CONNECTIONS IN ASYNCHRONOUS TRANSFER MODE VIRTUAL PATH SWITCHING SYSTEM

BACKGROUND OF THE INVENTION

1. Field of the Invention

The present invention relates to methods for performing origination and termination processes to control reserved semi-permanent virtual path connections in an asynchronous transfer mode virtual path switching system.

2. Description of the Prior Art

Asynchronous transfer mode (referred to hereinafter as ATM) switches have been rapidly developed in many countries of the world, for the early realization of a broadband service and the speedy service provision to end users. An ATM virtual path (VP) switching system does not control subscribers according to service control protocols defined between the subscribers and networks and between the networks, but semi-permanent virtual path connections using a management plane function in the system or network.

Even in the United Kingdom, Japan and etc., virtual paths are provided in ATM VP switching systems. In such an ATM VP switching system, virtual path and routing information regarding subscribers are fixedly stored in a control memory in the system in the system design, for the service provision based on virtual paths. For this reason, the contents of the control memory in tie system must be changed for the modification in the virtual paths during the operation of the system, resulting in a difficulty in flexibly controlling the virtual path connections.

SUMMARY OF THE INVENTION

Therefore, the present invention has been made in view of the above problem, and it is an object of the present invention to provide methods for performing origination and termination processes to control reserved semi-permanent virtual path connections in an ATM VP switching system, in which a service can flexibly be provided based on semi-permanent virtual path connection information for a desired time in response to a reserved semi-permanent virtual path registration command received through an operator interface during the operation of the system, and the reserved semi-permanent virtual path connections can be controlled up to 256 per subscriber link of 155 Mbps class.

In accordance with one aspect of the present invention, there is provided a method for performing an origination process to control reserved semi-permanent virtual path connections in an asynchronous transfer mode virtual path switching system, comprising the first step of allowing a main module at an originating site to create a virtual path registration origination processor for performing a reserved semi-permanent virtual path registration process, upon receiving a reserved semi-permanent virtual path registration request from an operator through an operation/maintenance control module, the virtual path registration origination processor checking a system status and a reserved time, requesting the operation/maintenance control module to wait for a result of the reserved semi-permanent virtual path registration process, requesting a main module at a terminated site to perform the reserved semi-permanent virtual path registration process, if an available band amount is present in an originating subscriber link for the reserved semi-permanent virtual path registration process, receiving a result of the reserved semi-permanent virtual path registration process from a virtual path registration termination processor at the terminated site, requesting the main module at the originating site to register reserved semi-permanent virtual path setting and release timers respectively indicating a service start time and a service end time, if the received result is normal, receiving a result of the reserved semi-permanent virtual path setting/release timer registration from the main module at the originating site, storing originating site connection registration information if the received result is normal and notifying the operation/maintenance control module that the reserved semi-permanent virtual path registration process has been completed; the second step of allowing the main module at the originating site to register the reserved semi-permanent virtual path setting and release timers in response to the reserved semi-permanent virtual path setting/release timer registration request from the virtual path registration origination processor; the third step of allowing the main module at the originating site to create a virtual path setting origination processor for performing a reserved semi-permanent virtual path setting process, upon receiving a reserved semi-permanent virtual path setting request from the registered virtual path setting timer, the virtual path setting origination processor checking the virtual path registration information and system status, obtaining user cell monitoring information, producing forward routing information from an originating subscriber to a terminated subscriber, requesting the main module at the terminated site to perform the reserved semi-permanent virtual path setting process, receiving a result of the reserved semi-permanent virtual path setting process from a virtual path setting termination processor at the terminated site, storing the forward routing information if the received result is normal, sending header conversion information containing the forward routing information and user cell monitoring information to an originating subscriber interface module, receiving the stored result of the header conversion information from the originating subscriber interface module, requesting the operation/maintenance control module to perform the maintenance of the set semi-permanent virtual path, if the received result is normal, and notifying the operation/maintenance control module that the reserved semi-permanent virtual path setting process has been completed; and the fourth step of allowing the main module at the originating site to create a virtual path release origination processor for performing a reserved semi-permanent virtual path release process, upon receiving a reserved semi-permanent virtual path release request from the registered virtual path release timer, the virtual path release origination processor checking information necessary to the reserved semi-permanent virtual path release process, requesting the main module at the terminated site to perform the reserved semi-permanent virtual path release process, receiving a result of the reserved semi-permanent virtual path release process from a virtual path release termination processor at the terminated site, erasing information regarding a forward connection from the originating subscriber to the terminated subscriber, requesting the originating subscriber interface module to erase the header conversion information, receiving the erased result of the header conversion information from the originating subscriber interface module, requesting the operation/maintenance control module to stop the maintenance of the released semi-permanent virtual path, if the received result is normal, and notifying the operation/maintenance control module that the reserved semi-permanent virtual path release process has been completed.

In accordance with another aspect of the present invention, there is provided a method for performing a termination process to control reserved semi-permanent virtual path connections in an asynchronous transfer mode virtual path switching system, comprising the first step of allowing a main module at a terminated site to create a virtual path registration termination processor for performing a reserved semi-permanent virtual path registration process, upon receiving a reserved semi-permanent virtual path registration request from a virtual path registration origination processor at an originating site, the virtual path registration termination processor checking a system status and a reserved time, calculating an amount of band used in a terminated subscriber link, storing information regarding a reverse connection from a terminated subscriber to an originating subscriber and notifying the virtual path registration origination processor that the reserved semi-permanent virtual path registration process has been completed; the second step of allowing the main module at the terminated site to create a virtual path setting termination processor for performing a reserved semi-permanent virtual path setting process, upon receiving a reserved semi-permanent virtual path setting request from a virtual path setting origination processor at the originating site, the virtual path setting termination processor checking the virtual path registration information and system status, selecting a switch link between a terminated asynchronous transfer mode local switching subsystem and an asynchronous transfer mode central switching subsystem, producing reverse routing information from the terminated subscriber to the originating subscriber and forward routing information from the originating subscriber to the terminated subscriber, storing the produced reverse routing information, sending header conversion information containing the reverse routing information and user cell monitoring information to a terminated subscriber interface module, receiving the stored result of the header conversion information from the terminated subscriber interface module, requesting an operation/maintenance control module to perform the maintenance of the set semi-permanent virtual path, if the received result is normal, and notifying the virtual path setting origination processor that the reserved semi-permanent virtual path setting process has been completed; and the third step of allowing the main module at the terminated site to create a virtual path release termination processor for performing a reserved semi-permanent virtual path release process, upon receiving a reserved semi-permanent virtual path release request from a virtual path release origination processor at the originating site, the virtual path release termination processor checking information necessary to the reserved semi-permanent virtual path release process, erasing information regarding a forward connection from the originating subscriber to the terminated subscriber, requesting the terminated subscriber interface module to erase the header conversion information, receiving the erased result of the header conversion information from the terminated subscriber interface module, requesting the operation/maintenance control module to stop the maintenance of the released semi-permanent virtual path, if the received result is normal, and notifying the virtual path release origination processor that the reserved semi-permanent virtual path release process has been completed.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
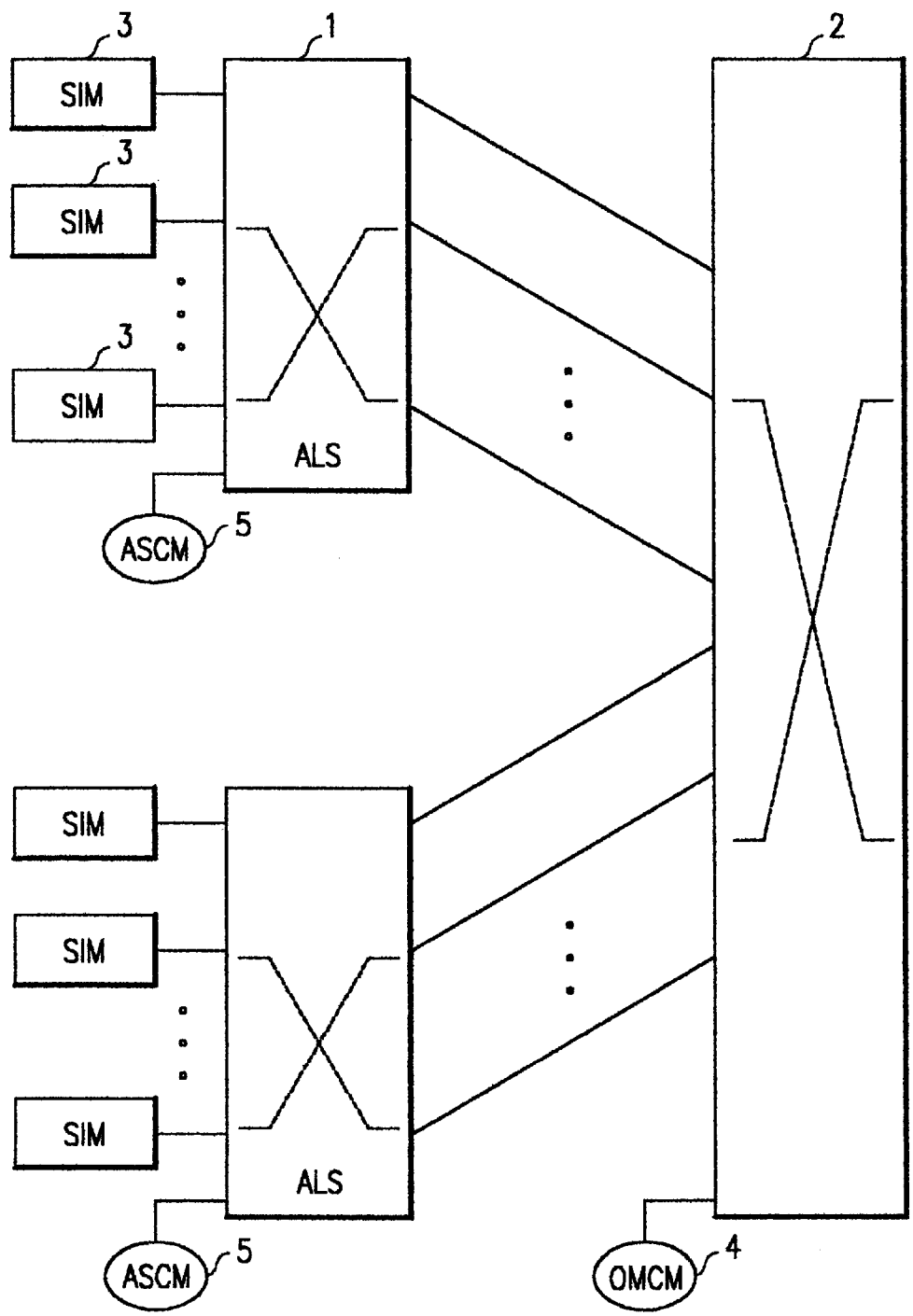
FIG. 1 is a schematic block diagram illustrating the construction of an ATM VP switching system to which the present invention is applied.

Referring to FIG. 1, there is shown in block form the construction of an ATM VP switching system to which the present invention is applied. In this drawing, the reference numeral 1 designates ATM local switching subsystems (referred to hereinafter as ALSs), 2 designates an ATM central switching subsystem (referred to hereinafter as ACS), 3 designates subscriber interface modules (referred to hereinafter as SIMs), 4 designates an operation & maintenance control module (referred to hereinafter as OMCM), and 5 designates access switching control modules (referred to hereinafter as ASCMs).

The ATM VP switching system basically comprises the ACS 2 and the individual ALSs 1 interconnected with the ACS 2.

Each SIM 3 is adapted to perform cell transmission and reception between a subscriber and a network. The OMCM 4 is adapted to control input and output messages regarding a reserved semi-permanent virtual path registration request from the operator. Each ALS 1 is adapted to manage the registration of reserved semi-permanent virtual paths and the registered virtual paths. Each ASCM 5 is adapted to control subscriber calls in the corresponding ALS 1.

Figure 2:
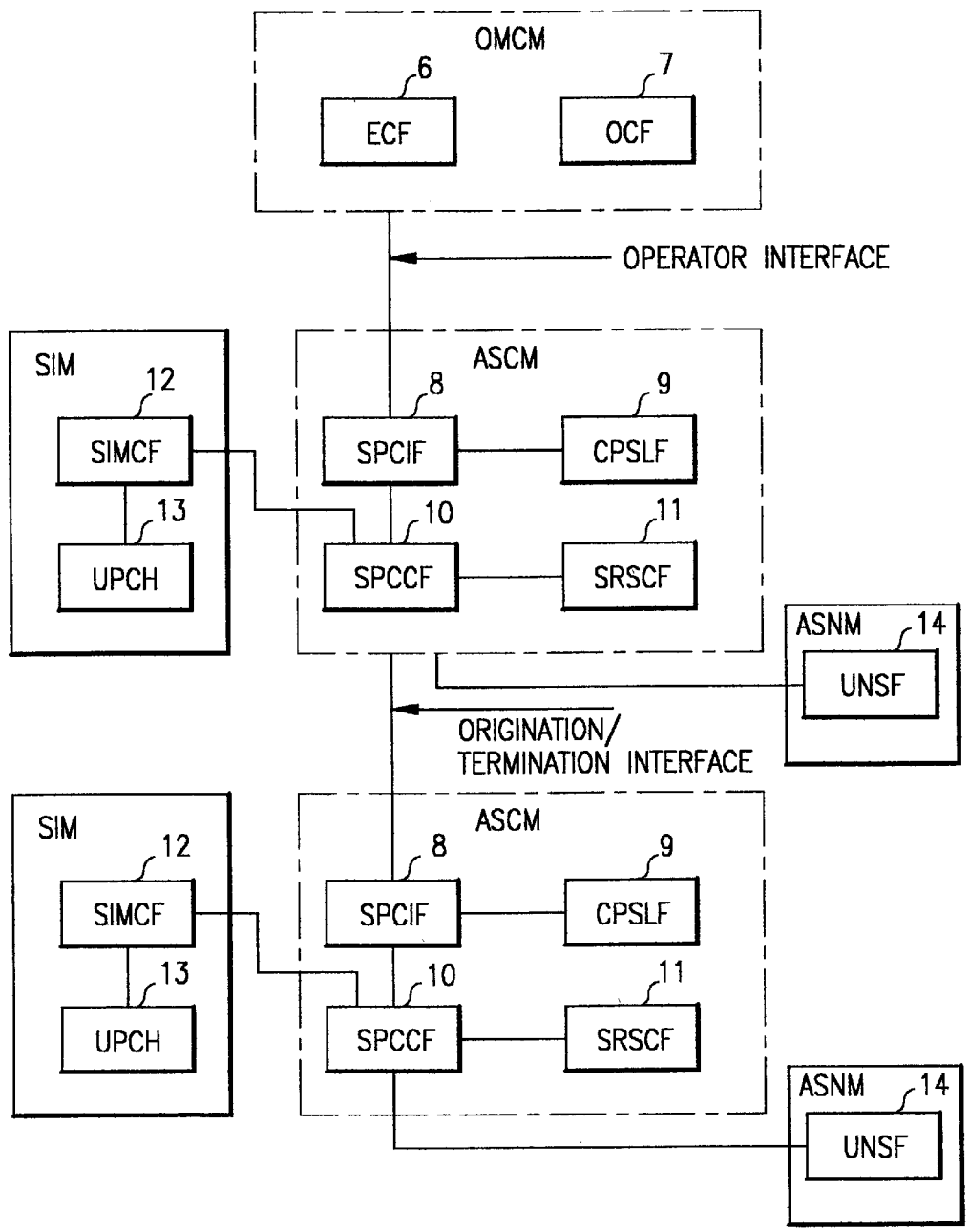
FIG. 2 is a detailed software functional block diagram of the ATM VP switching system in FIG. 2.

FIG. 2 is a detailed software functional block diagram of the ATM VP switching system in FIG. 2. The OMCM 4 includes an execution control software (referred to hereinafter as ECF) block 6 and an output control software (referred to hereinafter as OCF) block 7.

The ECF block 6 is adapted to process a command inputted from the operator. Namely, the ECF 6 analyzes the command inputted from the operator to send an inter-processor communication (IPC) message corresponding to the input command to a processor which peirforms a process corresponding to the input command.

The OCF block 7 is adapted to send a system output message and an output message regarding the input command from the operator to an operator terminal.

Each ASCM 5 includes a semi-permanent connection interface software (referred to hereinafter as SPCIF) block 8, a common procedure & system library software (referred to hereinafter as CPSLF) block 9, a semi-permanent connection control software (referred to hereinafter as SPCCF) block 10, and a self-routing control software (referred to hereinafter as SRSCF) block 11.

The SPCIF block 8 is adapted to receive the reserved semi-permanent virtual path registration request from the operator through the OMCM 4 and transfer the received request to an origination processor. The SPCIF block 8 also receives a reserved semi-permanent virtual path connection request from the origination processor and transfers the received request to a termination processor.

The CPSLF block 9 is adapted to manage common data and procedure data used when the SPCIF block 8 transfers the reserved semi-permanent virtual path connection request between the origination and termination processors.

The SPCCF block 10 is adapted to perform origination and termination processing functions in response to the reserved semi-permanent virtual path registration request from the SPCIF block 8.

The SRSCF block 11 is adapted to select an internal switch link for a forward connection from an originating subscriber to a terminated subscriber or a reverse connection from the terminated subscriber to the originating subscriber, for the transfer of a subscriber information cell between the originating and terminated subscribers. The SRSCF block 11 also produces routing information regarding the selected switch link.

Each SIM 3 includes a subscriber interface module control software (referred to hereinafter as SIMCF) block 12 and a usage parameter control hardware (referred to hereinafter as UPCH) block 13.

The SIMCF block 12 is provided as a firmware in the SIM 3. The SIMCF block 12 is adapted to receive subscriber information routing information from the SPCCF block 10 and manage the received routing information. The SIMCF block 12 also appends switch routing information to a subscriber information cell to enable the information transfer between an originating subscriber and a terminated subscriber.

The UPCH block 13 is adapted to perform a subscriber information control function using the maximum cell rate and a cell delay deviation regarding a virtual path connection.

Each access switch network module (referred to hereinafter as ASNM) includes a user network status software (referred to hereinafter as UNSF) block 14. The UNSF block 14 is adapted to receive virtual path connection information from the SPCCF block 10, and monitor the performance of a subscriber link and manage the status thereof in response to the received virtual path connection information.

Figure 3:
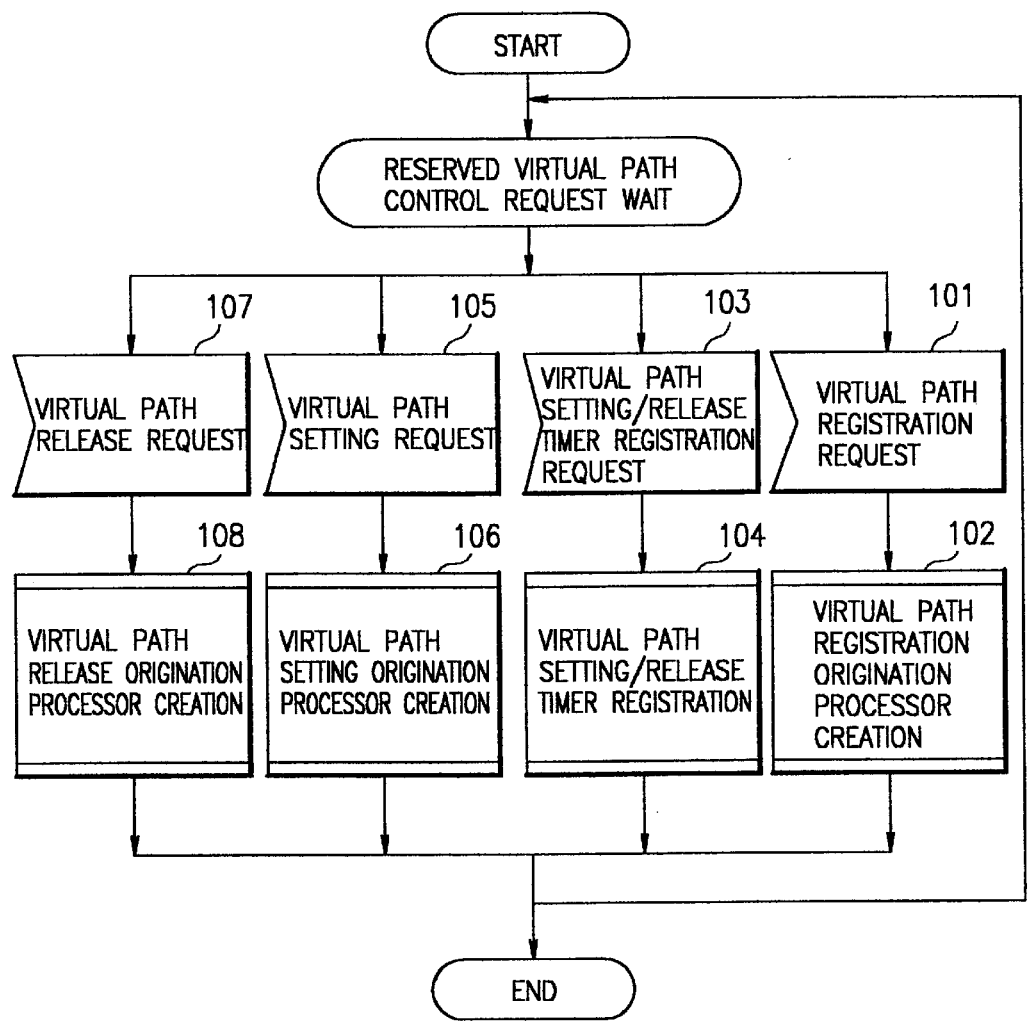
FIG. 3 is a flowchart illustrating the operation of a main module at an originating site which controls reserved semi-permanent virtual path connections in the ATM VP switching system in FIGS. 1 and 2 in accordance with the preferred embodiment of the present invention.

FIG. 3 is a flowchart illustrating the operation of a main module at an originating site which controls reserved semi-permanent virtual path connections in the ATM VP switching system in FIGS. 1 and 2 in accordance with the preferred embodiment of the present invention. If the main module receives the reserved semi-permanent virtual path registration request from the operator through the OMCM 4 at step 101, it creates an origination processor for performing a reserved semi-permanent virtual path registration process, at step 102. If the main module receives a reserved semi-permanent virtual path setting/release timer registration request from the registration process origination processor at step 103, it registers virtual path setting and release timers at step 104. When the registered virtual path setting timer is driven to indicate a service start time, it sends a reserved semi-permanent virtual path setting request to the main module. In the case where the main module receives the reserved semi-permanent virtual path setting request from the registered virtual path setting timer at step 105, it creates an origination processor for performing a reserved semi-permanent virtual path setting process, at step 106. When the registered virtual path release timer is driven to indicate a service end time, it sends a reserved semi-permanent virtual path release request to the main module. If the main module receives the reserved semi-permanent virtual path release request from the registered virtual path release timer at step 107, it creates an origination processor for performing a reserved semi-permanent virtual path release process, at step 108. When creating the origination processors, the main module transfers information necessary to the reserved semi-permanent virtual path control as an argument.

Figure 4A:
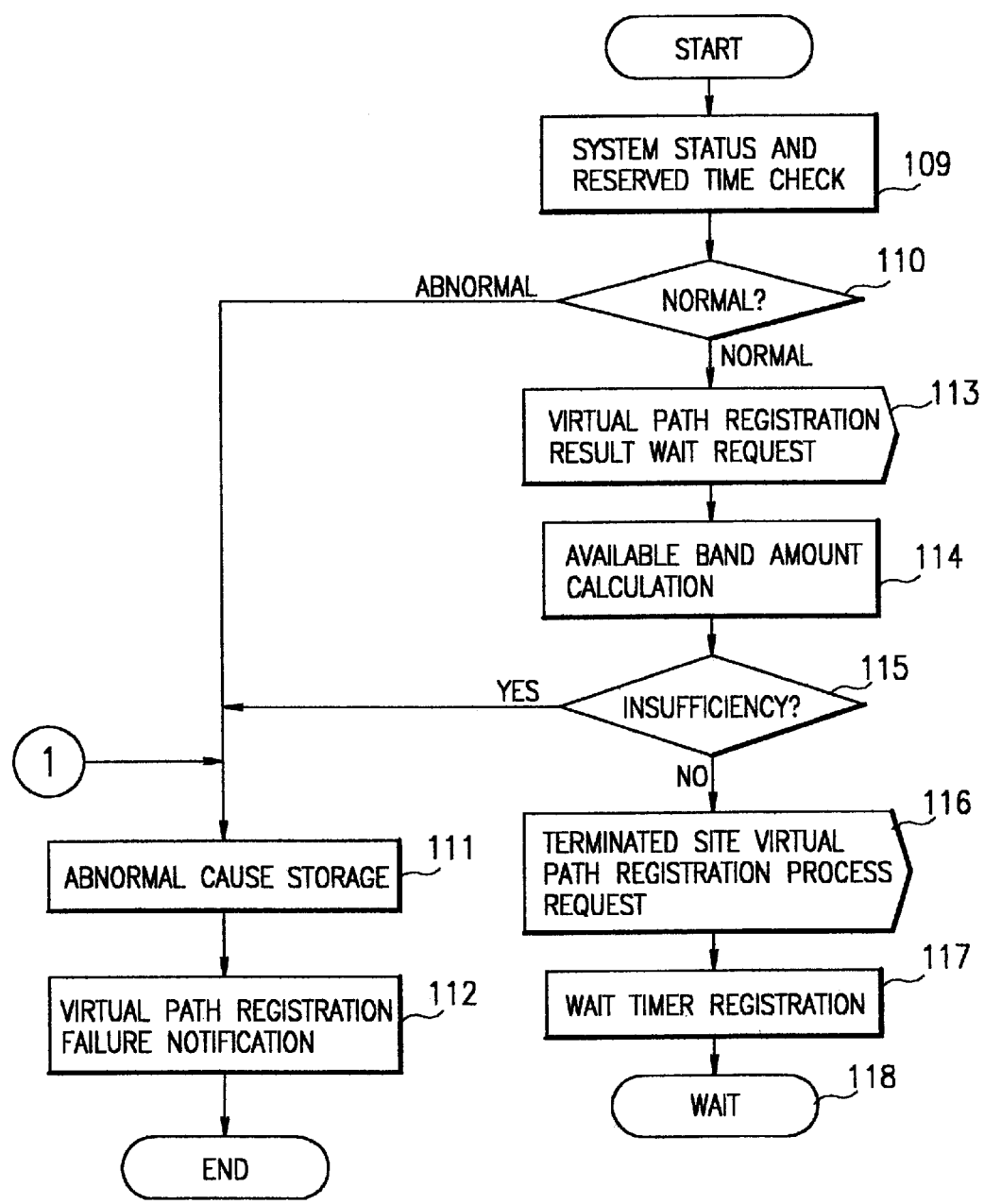
FIGS. 4A and 4B are flowcharts illustrating the operation of an origination processor in FIG. 3 for performing a reserved semi-permanent virtual path registration process in the ATM VP switching system in FIGS. 1 and 2 in accordance with the preferred embodiment of the present invention.
Figure 4B:
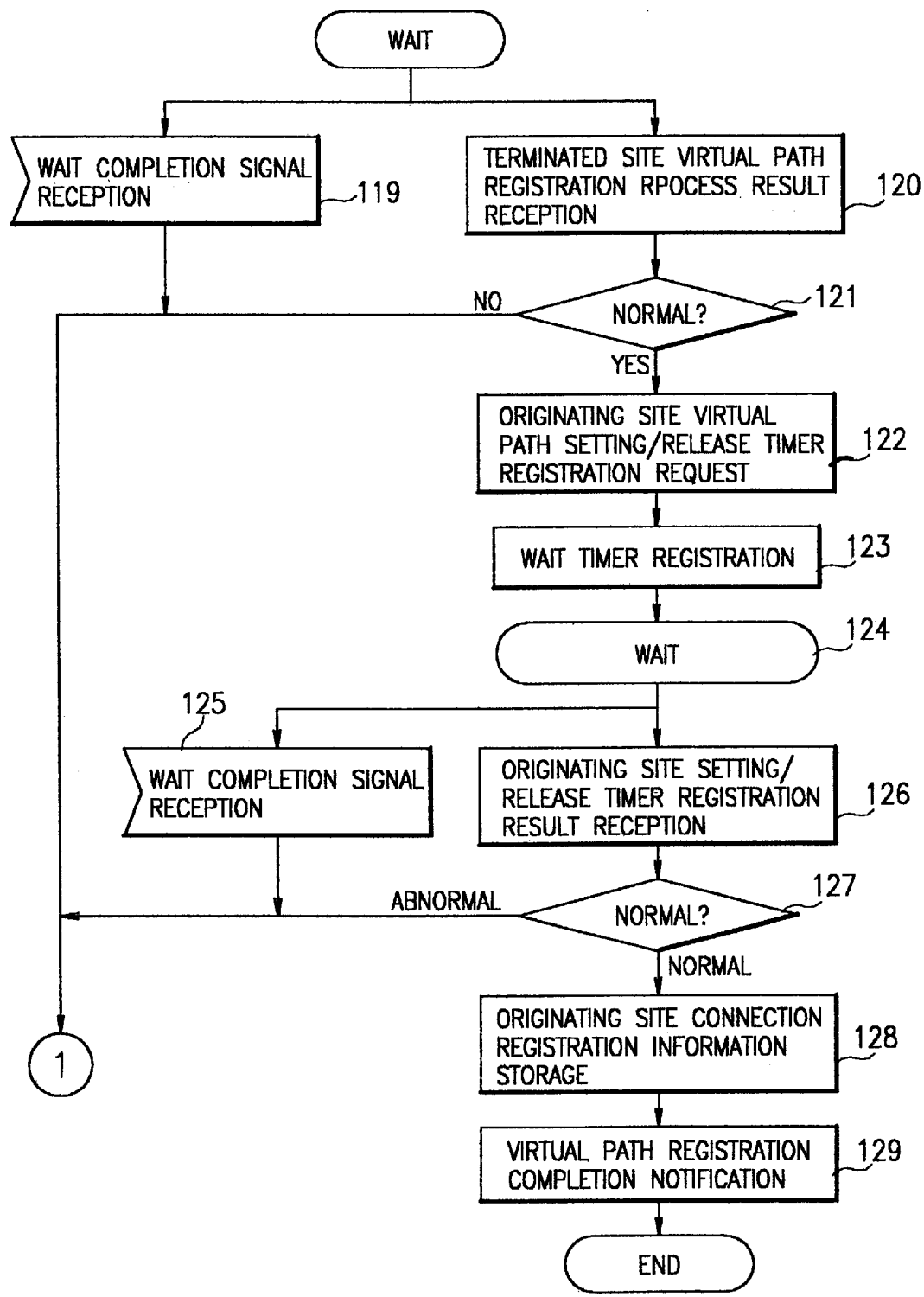

FIGS. 4A and 4B are flowcharts illustrating the operation of the origination processor in FIG. 3 for performing the reserved semi-permanent virtual path registration process in the ATM VP switching system in FIGS. 1 and 2 in accordance with the preferred embodiment of the present invention. First, in response to the reserved semi-permanent virtual path registration request from the OMCM 4, the origination processor checks at step 109 whether the installation and maintenance status of an originating subscriber link to be registered are normal, a virtual path to be registered has previously been registered, a virtual path identifier (VPI) regarding the virtual path to be registered is acceptable, the number of connections in the originating subscriber link to be registered is equal to the maximum value (256) and an error is present in a designated time. Then, the origination processor analyzes the results checked at the above step 109 to determine whether the checked results are all normal, at step 110. If it is determined at the above step 110 that all of the results checked at the above step 109 are not normal, namely, the originating subscriber link to be registered is not installed, the originating subscriber link to be registered is in malfunction, the virtual path to be registered has previously been registered, the virtual path identifier regarding the virtual path to be registered is not acceptable, the number of connections in the originating subscriber link to be registered is equal to the maximum value, or the error is present in the designated time, then the origination processor stores the abnormal causes at step 111. Then, the origination processor notifies the OMCM 4 that it failed in reserved semi-permanent virtual path registration, at step 112.

In the case where it is determined it the above step 110 that the results checked at the above step 109 are all normal, the origination processor requests the OMCM 4 to wait for the result of the reserved semi-permanent virtual path registration process, at step 113. Then, the origination processor calculates an amount of band used in the originating subscriber link at a time zone between the service start time and the service end time at step 114 to check at step 115 whether an available band amount is present in the originating subscriber link for the reserved semi-permanent virtual path registration process. If it is checked at the above step 115 that no available band amount is present in the originating subscriber link for the reserved semi-permanent virtual path registration process, the origination processor proceeds to the above step 111 to store the cause of "available band amount insufficiency". Then, the origination processor notifies the OMCM 4 that it failed in reserved semi-permanent virtual path registration, at step 112. However, in the case where it is checked at the above step 115 that the available band amount is present in the originating subscriber link for the reserved semi-permanent virtual path registration process, the origination processor requests a main module at a terminated site to perform the reserved semi-permanent virtual path registration process, at step 116. At this time, the origination processor sends to the main module at the terminated site, a signal containing information regarding a terminated subscriber link number, a terminated virtual path identifier, a desired band amount, the service start time and the service end time necessary to the reserved semi-permanent virtual path registration process, to check whether the reserved semi-permanent virtual path registration process is enabled in a terminated link. Then, the origination processor registers a wait timer at step 117 and enters a wait mode at step 118 to receive the result of the reserved semi-permanent virtual path registration process from a corresponding termination processor at the terminated site.

If a wait completion signal is received from the registered wait timer at step 119 before the result of the reserved semi-permanent virtual path registration process is received from the corresponding termination processor at the terminated site, the origination processor proceeds to the above step 111 to store the cause of "terminated site reserved semi-permanent virtual path registration process disable". Then, the origination processor notifies the OMCM 4 that it failed in reserved semi-permanent virtual path registration, at step 112. In the case where the result of the reserved semi-permanent virtual path registration process is received from the corresponding termination processor at the terminated site at step 120, the origination processor analyzes the received result to check whether it is normal, at step 121. If it is checked at the above step 121 that the received result is not normal, the origination processor proceeds to the above step 111 to store the cause of "terminated site reserved semi-permanent virtual path registration failure". Then, the origination processor notifies the OMCM 4 that it failed in reserved semi-permanent virtual path registration, at step 112. Also, the origination processor stores information regarding a forward connection from an originating subscriber to a terminated subscriber in a connection information management database. At this time, if the origination processor fails in the storage, the origination processor proceeds to the above step 111 to store the cause of "database connection information storage failure". Then, the origination processor notifies the OMCM 4 that it failed in reserved semi-permanent virtual path registration, at step 112. However, in the case where it is checked at the above step 121 that the received result is normal, the origination processor requests the main module at the originating site to register the reserved semi-permanent virtual path setting and release timers indicating the service start time and the service end time, at step 122. Then, the origination processor registers a wait timer at step 123 and enters a wait mode at step 124 to receive the result of the reserved semi-permanent virtual path setting/release timer registration from the main module at the originating site. If a wait completion signal is received from the registered wait timer at step 125 before the result of the reserved semi-permanent virtual path setting/release timer registration is received from the main module at the originating site, the origination processor proceeds to the above step 111 to store the abnormal cause. Then, the origination processor notifies the OMCM 4 that it failed in reserved semi-permanent virtual path registration, at step 112. In the case where the result of the reserved semi-permanent virtual path setting/release timer registration is received from the main module at the originating site at step 126, the origination processor analyzes the received result to check whether it is normal, at step 127. If it is checked at the above step 127 that the received result is not normal, the origination processor proceed(eds to the above step 111 to store the abnormal cause. Then, the origination processor notifies the OMCM 4 that it failed in reserved semi-permanent virtual path registration, at step 112. However, in the case where it is checked at the above step 127 that the received result is normal, the origination processor stores originating site connection registration information at step 128 and notifies the OMCM 4 that the reserved semi-permanent virtual path registration process has been completed, at step 129. Then, the origination processor ends the operation.

Figure 5A:
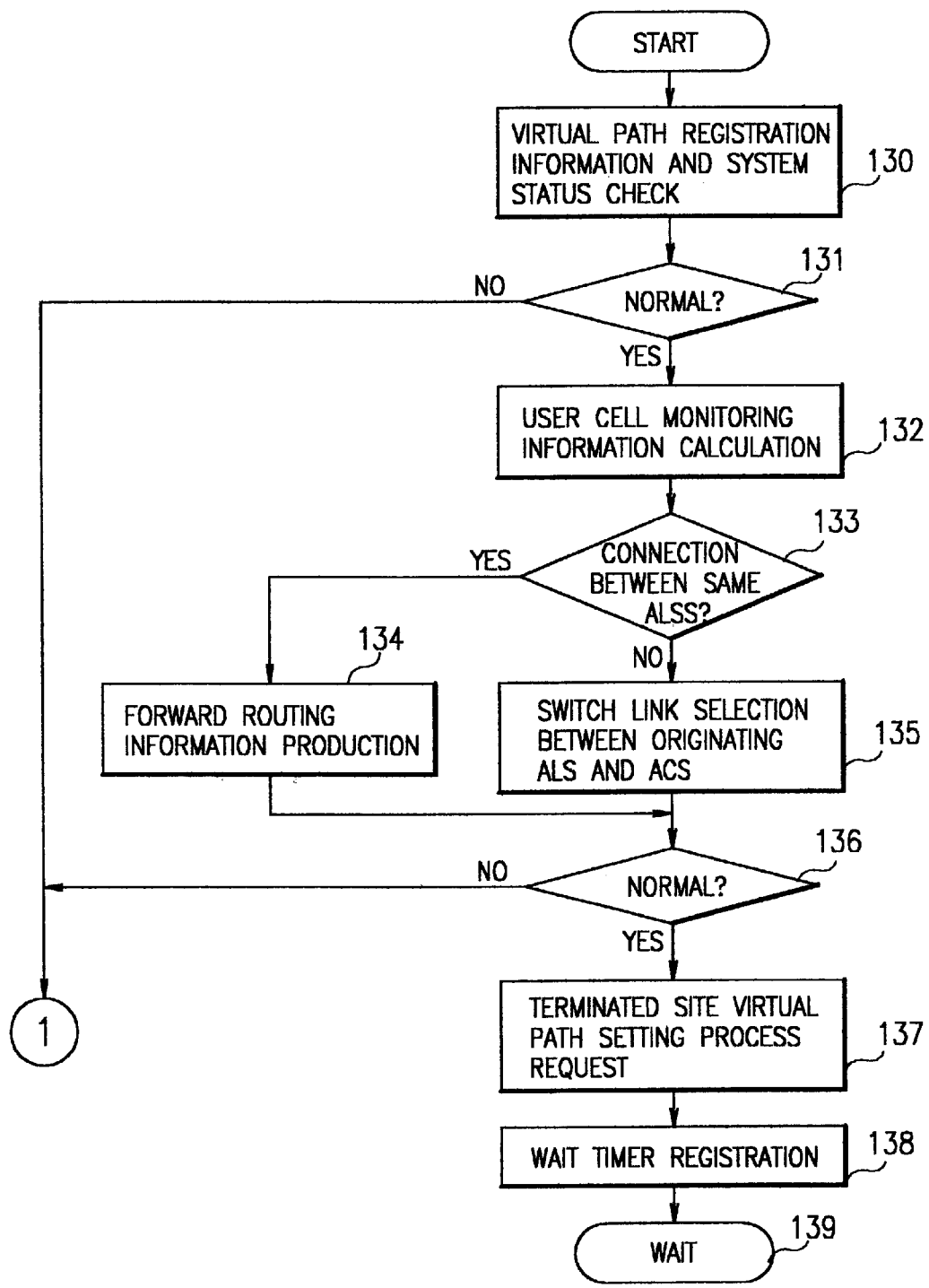
FIGS. 5A to 5C are flowcharts illustrating the operation of an origination processor in FIG. 3 for performing a reserved semi-permanent virtual path setting process in the ATM VP switching system in FIGS. 1 and 2 in accordance with the preferred embodiment of the present invention.
Figure 5B:
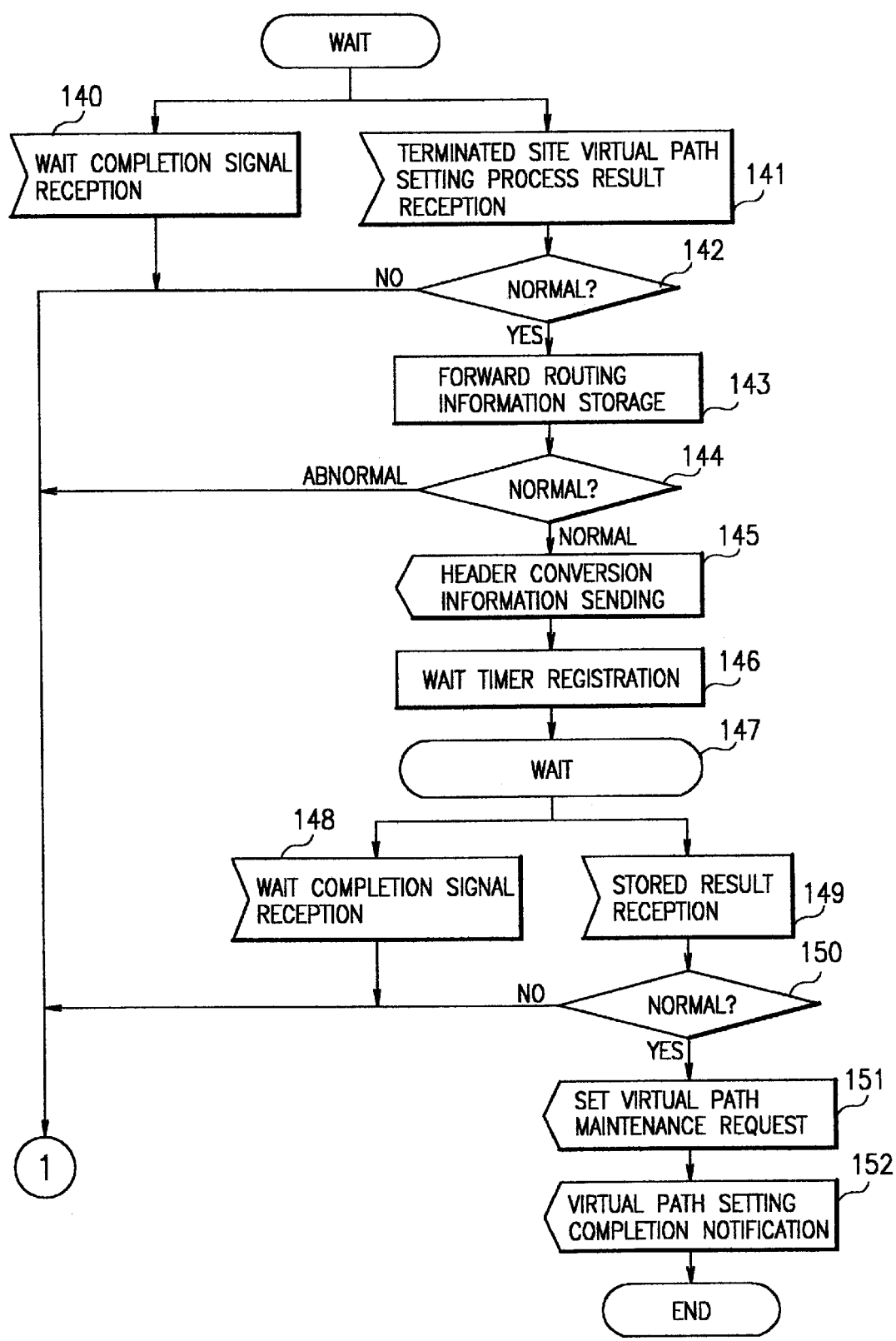
Figure 5C:
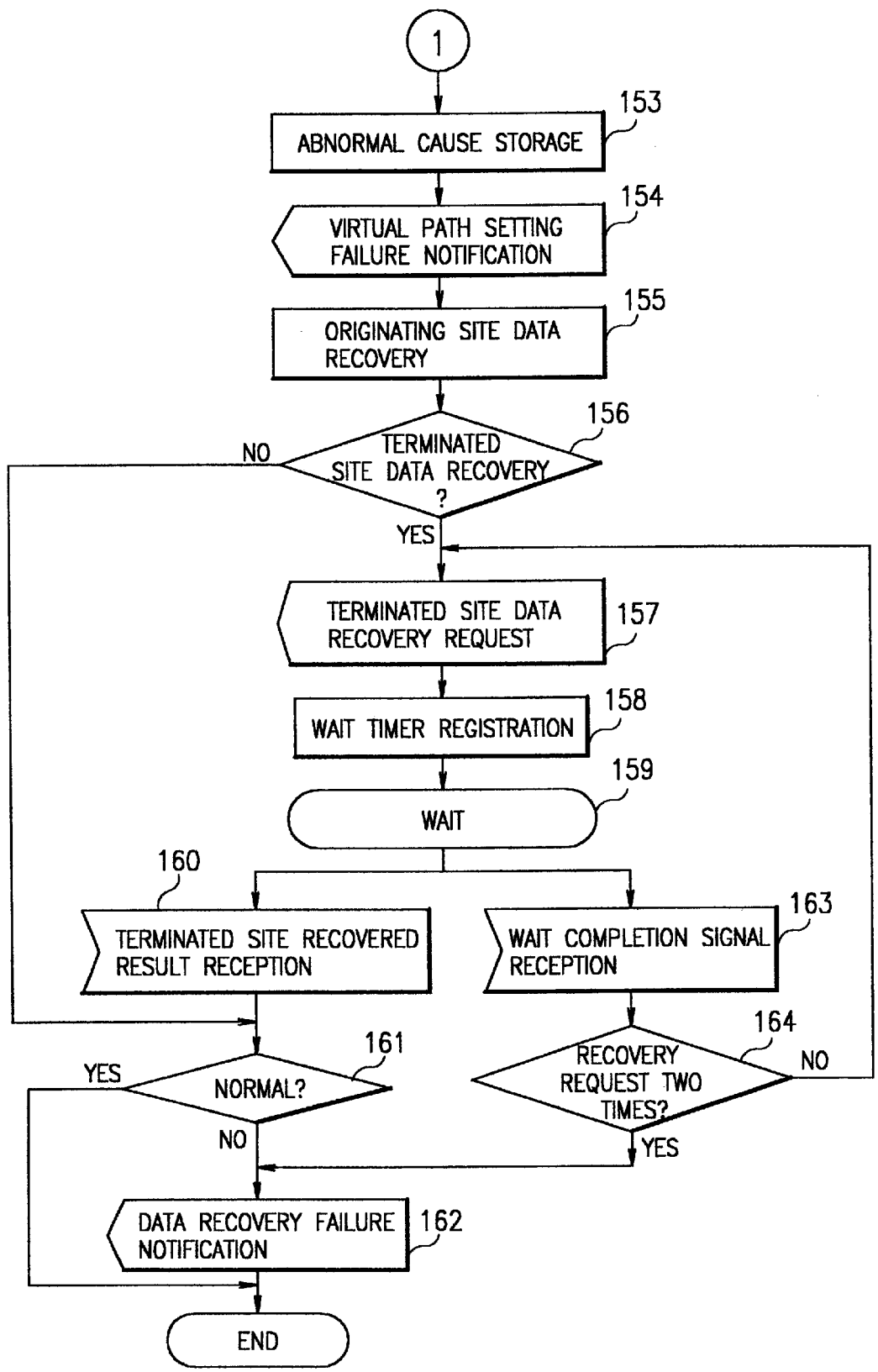

FIGS. 5A to 5C are flowcharts illustrating the operation of the origination processor in FIG. 3 for performing the reserved semi-permanent virtual path setting process in the ATM VP switching system in FIGS. 1 and 2 in accordance with the preferred embodiment of the present invention. The origination processor performs the reserved semi-permanent virtual path setting process when the virtual path setting timer in FIG. 3 is driven to indicate the registered reserved semi-permanent virtual path service start time. First, at step 130, the origination processor confirms the virtual path registration information and checks whether the installation and maintenance status of an originating subscriber link to be set ace normal. Then, the origination processor determines at step 131 whether the results checked at the above step 130 are both normal. If it is determined at the above step 131 that both of the results checked at the above step 130 are not normal, namely, the originating subscriber link to be set is not installed or the originating subscriber link to be set is in malfunction, the origination processor stores the abnormal causes at step 153. Then, the origination processor processes the originating site abnormal status, as will be mentioned later in detail. However, in the case where it is determined at the above step 131 that the results checked at the above step 130 are both normal, the origination processor calculates user cell monitoring information, or the number of cells per second and a cell delay deviation, at step 132. Then, the origination processor checks at step 133 whether the semi-permanent virtual path connection between the originating subscriber and terminated subscriber is to be made in the same ALS 1.

If it is checked at the above step 133 that the semi-permanent virtual path connection between the originating subscriber and terminated subscriber is to be made in the same ALS 1, the origination processor produces forward routing information from the originating subscriber to the terminated subscriber at step 134. However, in the case where it is checked at the above step 133 that the semi-permanent virtual path connection between the originating subscriber and terminated subscriber is to be made in different ALSs 1, the origination processor selects a switch link between an originating one of the different ALSs 1 and the ACS 2 at step 135 and analyzes the selected result to check whether it is normal, at step 136. If it is checked at the above step 136 that the selected result is not normal, the origination processor proceeds to the above step 153 to store the abnormal cause. Then, the origination processor processes the originating site abnormal status, as will be mentioned later in detail. However, in the case where it is checked at the above step 136 that the selected result is normal, the origination processor requests the main module at the terminated site to perform the reserved semi-permanent virtual path setting process, at step 137. At this time, the origination processor sends to the main module at the terminated site, a signal containing information necessary to the reserved semi-permanent virtual path setting process and information regarding the selected switch link. Then, the origination processor registers a wait timer at step 138 and enters a wait mode at step 139 to receive the result of the reserved semi-permanent virtual path setting process from a corresponding termination processor at the terminated site.

If a wait completion signal is received from the registered wait timer at step 140 before the result of the reserved semi-permanent virtual path setting process is received from the corresponding termination processor at the terminated site, the origination processor proceeds to the step 153 to store the cause of "terminated site reserved semi-permanent virtual path setting process disable". Then, the origination processor processes the originating site abnormal status, as will be mentioned later in detail. In the case where the result of the reserved semi-permanent virtual path setting process is received from the corresponding termination processor at the terminated site at step 141, the origination processor analyzes the received result to check whether it is normal, at step 142. If it is checked at the above step 142 that the received result is not normal, the origination processor proceeds to the above step 153 to store the cause of "terminated site reserved semi-permanent virtual path setting failure". Then, the origination processor processes the originating site abnormal status, as will be mentioned later in detail. However, in the case where it is checked at the above step 142 that the received result is normal, the origination processor stores the forward routing information from the originating subscriber to the terminated subscriber in a connection information management database, at step 143. Then, the origination processor checks at step 144 whether the routing information stored result is normal. If it is checked at the above step 144 that the routing information stored result is not normal, the origination processor proceeds to the above step 153 to store the cause of "database connection information storage failure". Then, the origination processor processes the originating site abnormal status, as will be mentioned later in detail. However, in the case where it is checked it the above step 144 that the routing information stored result is normal, the origination processor sends header conversion information containing the forward routing information and user cell monitoring information to the originating SIM 3, at step 145. Then, the origination processor registers a wait timer at step 146 and enters a wait mode at step 147 to receive the stored result of the header conversion information from the originating SIM 3.

If a wait completion signal is received from the registered wait timer at step 148 before the stored result of the header conversion information is received from the originating SIM 3, the origination processor proceeds to the above step 153 to store the cause of "originating site routing information storage disable". Then, the origination processor processes the originating site abnormal status, as will be mentioned later in detail. In the case where the stored result of the header conversion information is received from the originating SIM 3 at step 149, the origination processor analyzes the received result to check whether it is normal, at step 150. If it is checked at the above step 150 that the received result is not normal, the origination processor proceeds to the above step 153 to store the cause of "SIM routing information storage disable". Then, the origination processor processes the originating site abnormal status, as will be mentioned later in detail. However, in the case where it is checked at the above step 150 that the received result is normal, the origination processor requests the OMCM 4 to perform the maintenance of the set semi-permanent virtual path, at step 151, and notifies the OMCM 4 that the reserved semi-permanent virtual path setting process has been completed, at step 152. Then, the origination processor ends the operation.

On the other hand, after the abnormal causes are stored at step 153, the origination processor notifies the OMCM 4 that it failed in reserved semi-permanent virtual path setting and transfers the abnormal causes to the OMCM 4, at step 154.

Then, the origination processor recovers originating site data due to the reserved semi-permanent virtual path setting failure at step 155. At this time, the occupied band amount is withdrawn and the connection management information is erased. The origination processor checks at step 156 whether the abnormal status has occurred after the terminated site process completion. If it is checked at the above step 156 that the abnormal status has occurred after the terminated site process completion, the origination processor requests the corresponding termination processor at the terminated site to recover terminated site data, at step 157. Then, the origination processor registers a wait timer at step 158 and enters a wait mode at step 159 to receive the recovered result of the terminated site data from the corresponding termination processor at the terminated site. If a wait completion signal is received from the registered wait timer at step 163 before the recovered result of the terminated site data is received from the corresponding termination processor at the terminated site, the origination processor returns to the above step 157 to perform the terminated site data recovery request procedure up to two times, at step 164. On the other hand, in the case where the recovered result of the terminated site data is received from the corresponding termination processor at the terminated site at step 160, the origination processor analyzes the received result to check whether it is normal, at step 161. If it is checked at the above step 161 that the received result is normal, the origination processor ends the operation. However, in the case where it is checked at the above step 161 that the received result is not normal, the origination processor outputs a data recovery failure message to the OMCM 4 at step 162 and then ends the operation.

Figure 6A:
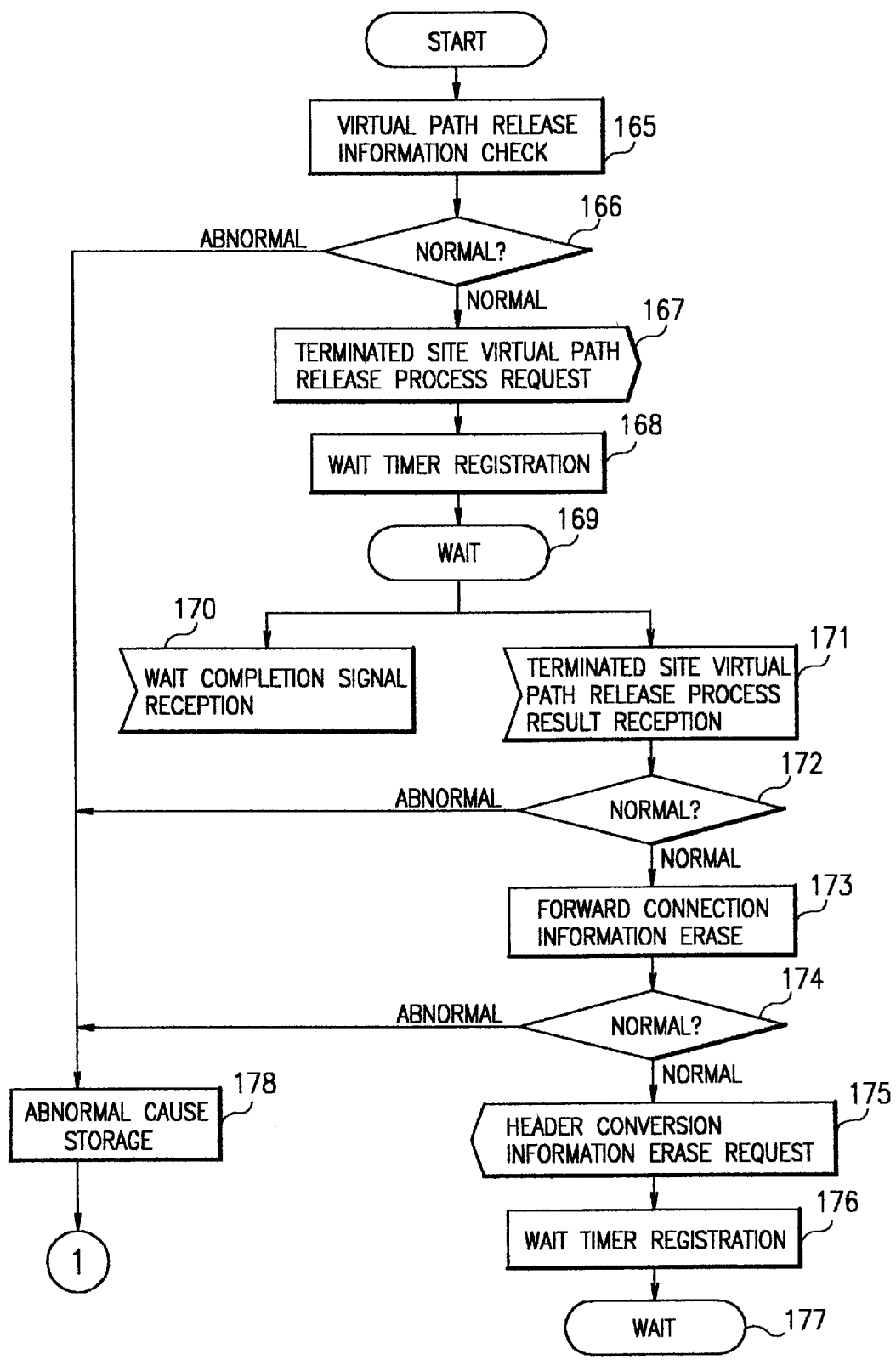
FIGS. 6A and 6B are flowcharts illustrating the operation of an origination processor in FIG. 3 for performing a reserved semi-permanent virtual path release process in the ATM VP switching system in FIGS. 1 and 2 in accordance with the preferred embodiment of the present invention.
Figure 6B:
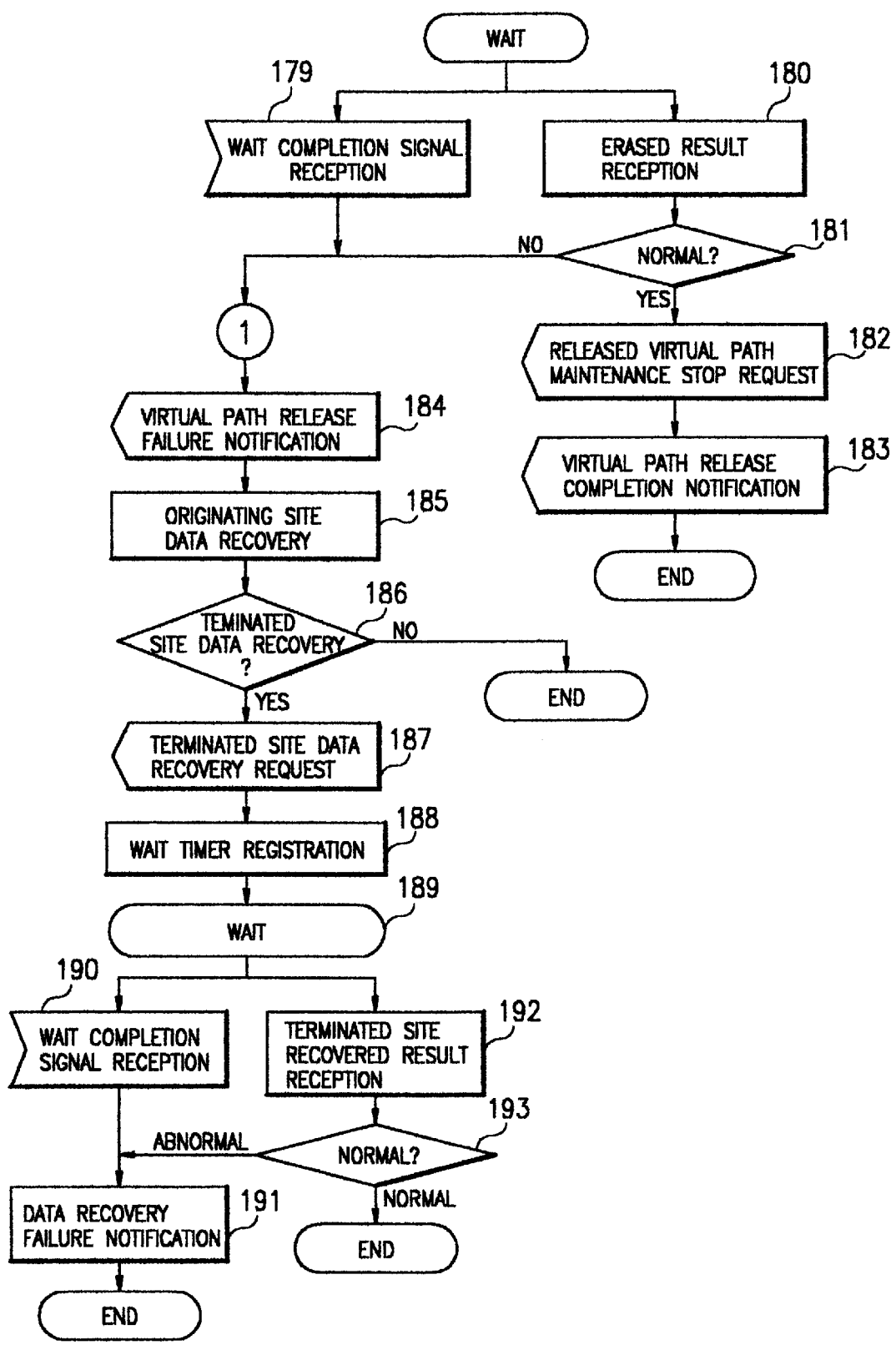

FIGS. 6A and 6B are flowcharts illustrating the operation of the origination processor in FIG. 3 for performing the reserved semi-permanent virtual path release process in the ATM VP switching system in FIGS. 1 and 2 in accordance with the preferred embodiment: of the present invention.

The origination processor performs the reserved semi-permanent virtual path release process when the virtual path release timer in FIG. 3 is driven to indicate the set reserved semi-permanent virtual path service end time. First, in order to verify information necessary to the reserved semi-permanent virtual path release process, received upon creation, the origination processor checks whether the installation status of an originating subscriber link to be released is normal, at step 165.

Then, the origination processor determines at step 166 whether the result checked at the above step 165 is normal. If it is determined at the above step 166 that the result checked at the above step 165 is not normal, namely, the originating subscriber link to be released is not installed, the origination processor stores the cause of "no originating subscriber link installation" at step 178. Then, the origination processor processes the originating site abnormal status, as will be mentioned later in detail.

In the case where it is determined at the above step 166 that the result checked at the above step 165 is normal, the origination processor requests the main module at the terminated site to perform the reserved semi-permanent virtual path release process, at step 167. At this time, the origination processor sends to the main module at the terminated site, a signal containing information necessary to the reserved semi-permanent virtual path release process. Then, the origination processor registers a wait timer at step 168 and enters a wait mode at step 169 to receive the result of the reserved semi-permanent virtual path release process from a corresponding termination processor at the terminated site.

If a wait completion signal is received from the registered wait timer at step 170 before the result of the reserved semi-permanent virtual path release process is received from the corresponding termination processor at the terminated site, the origination processor proceeds to the above step 178 to store the cause of "terminated site reserved semi-permanent virtual path release process disable". Then, the origination processor processes the originating site abnormal status, as will be mentioned later in detail. In the case where the result of the reserved semi-permanent virtual path release process is received from the corresponding termination processor at the terminated site at step 171, the origination processor analyzes the received result to check whether it is normal, at step 172. If it is checked at the above step 172 that the received result is not normal, the origination processor proceeds to the above step 178 to store the cause of "terminated site reserved semi-permanent virtual path release failure". Then, the origination processor processes the originating site abnormal status, as will be mentioned later in detail. However, in the case where it is checked at the above step 172 that the received result is normal, the origination processor erases information regarding a forward connection from an originating subscriber to a terminated subscriber in a connection information management database, at step 173. Also, the origination processor withdraws the occupied band amount from a link between the originating ALS 1 and ACS 2. Then, the origination processor checks at step 174 whether the erased result is normal. If it is checked at the above step 174 that the erased result is not normal, the origination processor proceeds to the above step 178 to store the cause of "database connection information erase failure". Then, the origination processor processes the originating site abnormal status, as will be mentioned later in detail. However, in the case where it is checked at the above step 174 that the erased result is normal, the origination processor requests the originating SIM 3 to erase header conversion information containing forward routing information and user cell monitoring information, at step 175. Then, the origination processor registers a wait timer at step 176 and enters a wait mode at step 177 to receive the erased result of the header conversion information from the originating SIM 3.

If a wait completion signal is received from the registered wait timer at step 179 before the erased result of the header conversion information is received from the originating SIM 3, the origination processor proceeds to the above step 178 to store the cause of "originating site routing information erase disable". Then, the origination processor processes the originating site abnormal status, as will be mentioned later in detail. In the case where the erased result of the header conversion information is received from the originating SIM 3 at step 180, the origination processor analyzes the received result to check whether it is normal, at step 181. If it is checked at the above step 181 that the received result is not normal, the origination processor proceeds to the above step 178 to store the cause of "SIM routing information erase disable". Then, the origination processor processes the originating site abnormal status, as will be mentioned later in detail. However, in the case where it is checked at the above step 181 that the received result is normal, the origination processor requests the OMCM 4 to stop the maintenance of the released semi-permanent virtual path, at step 182, and notifies the OMCM 4 that the reserved semi-permanent virtual path release process has been completed, at step 183. Then, the origination processor ends the operation.

On the other hand, after the abnormal causes are stored at step 178, the origination processor notifies the OMCM 4 that it failed in reserved semi-permanent virtual path release and transfers the abnormal causes to the OMCM 4, at step 184.

Then, the origination processor recovers originating site data due to the reserved semi-permanent virtual path release failure at step 185. At this time, the desired band amount is occupied and the connection management information is stored. The origination processor checks at step 186 whether the abnormal status has occurred after the terminated site process completion. If it is checked at the above step 186 that the abnormal status has occurred after the terminated site process completion, the origination processor requests the corresponding termination processor at the terminated site to recover terminated site data, at step 187. Then, the origination processor registers a wait timer at step 188 and enters a wait mode at step 189 to receive the recovered result of the terminated site data from the corresponding termination processor at the terminated site. If a wait completion signal is received from the registered wait timer at step 190 before the recovered result of the terminated site data is received from the corresponding termination processor at the terminated site, the origination processor outputs a data recovery failure message to the OMCM 1 at step 191 and then ends the operation. On the other hand, in the case where the recovered result of the terminated site data is received from the corresponding termination processor at the terminated site at step 192, the origination processor analyzes the received result to check whether it is normal, at step 193. If it is checked at the above step 193 that the received result is normal, the origination processor ends the operation. However, in the case where it is checked at the above step 193 that the received result is not normal, the origination processor outputs a data recovery failure message to the OMCM 4 at step 191 and then ends the operation.

Figure 7:
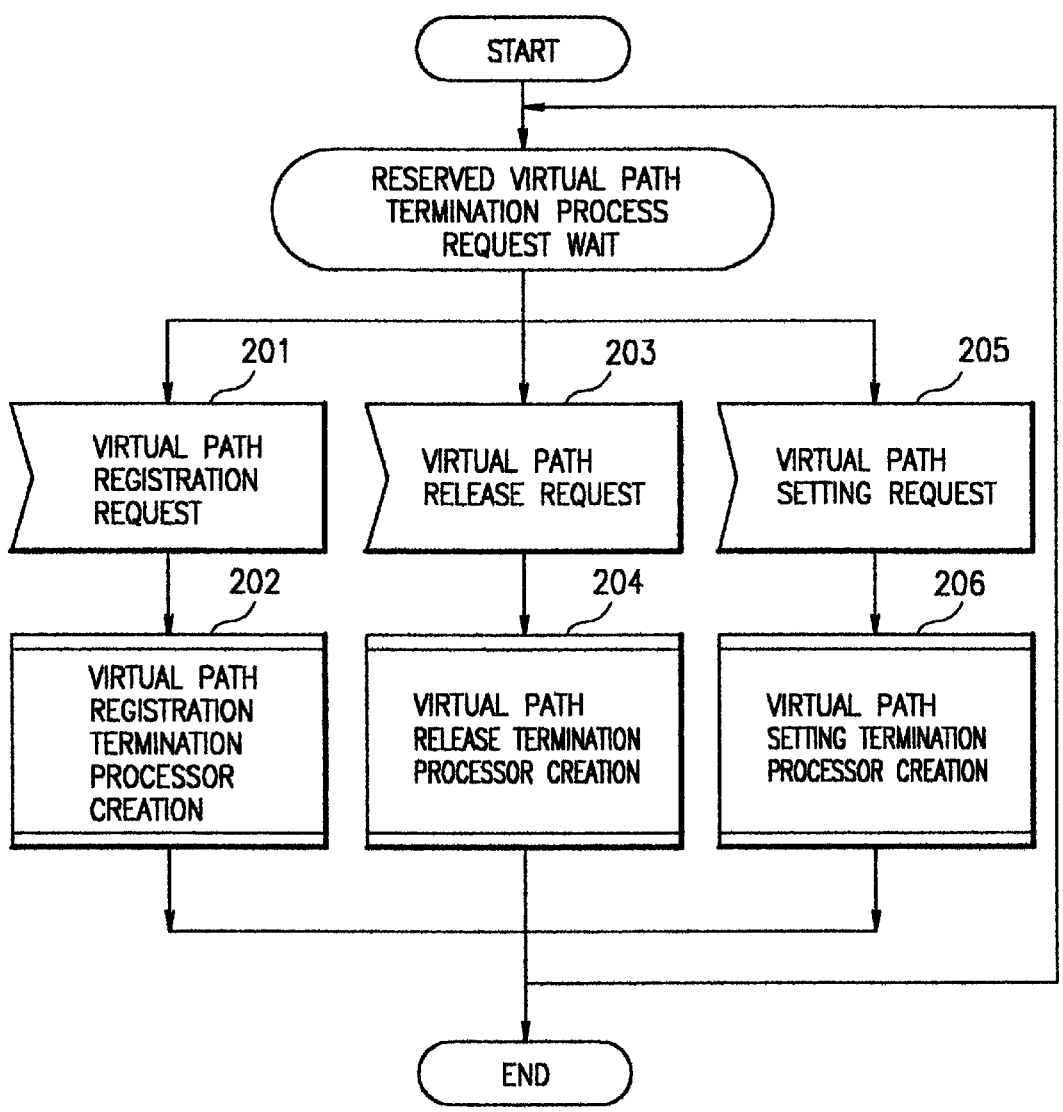
FIG. 7 is a flowchart illustrating the operation of a main module at a terminated site which controls the reserved semi-permanent virtual path connections in the ATM VP switching system in FIGS. 1 and 2 in accordance with the preferred embodiment of the present invention.

FIG. 7 is a flowchart illustrating the operation of the main module at the terminated site which controls the reserved semi-permanent virtual path connections in the ATM VP switching system in FIGS. 1 and 2 in accordance with the preferred embodiment of the present invention. If the main module at the terminated site receives the reserved semi-permanent virtual path registration request from a corresponding origination processor at the originating site at step 201, it creates a termination processor for performing the reserved semi-permanent virtual path registration process, at step 202. If thief main module at the terminated site receives the reserved semi-permanent virtual path release request from a corresponding origination processor at the originating site at step 203, it creates a termination processor for performing the reserved semi-permanent virtual path release process, at step 204. If the main module at the terminated site receives the reserved semi-permanent virtual path setting request from a corresponding origination processor at the originating site at step 205, it creates a termination processor for performing the reserved semi-permanent virtual path setting process, at step 201. When creating the termination processors, the main module at the terminated site transfers information necessary to the reserved semi-permanent virtual path control as an argument.

Figure 8:
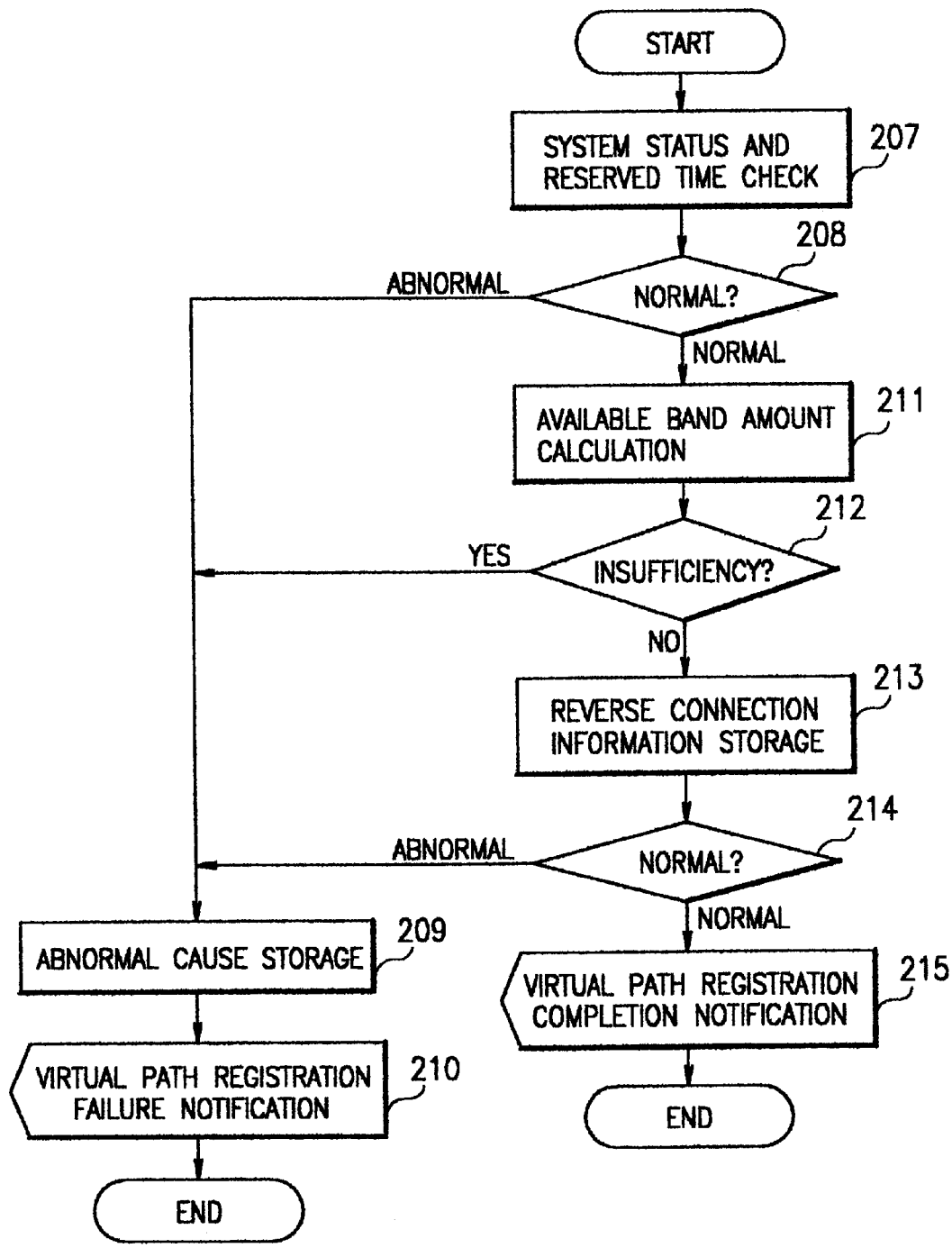
FIG. 8 is a flowchart illustrating the operation of a termination processor in FIG. 7 for performing the reserved semi-permanent virtual path registration process in the ATM VP switching system in FIGS. 1 and 2 in accordance with the preferred embodiment of the present invention.

FIG. 8 is a flowchart illustrating the operation of the termination processor in FIG. 7 for performing the reserved semi-permanent virtual path registration process in the ATM VP switching system in FIGS. 1 and 2 in accordance with the preferred embodiment of the present invention. Upon receiving the reserved semi-permanent virtual path registration request from the corresponding origination processor at the originating site, the termination processor checks at step 207 whether the installation and maintenance status of a terminated subscriber link to be registered are normal, a virtual path to be registered has previously been registered and a virtual path identifier (VPI) regarding the virtual path to be registered is acceptable. Then, the termination processor determines at step 208 whether the results checked at the above step 207 are all normal. If it is determined at the above step 208 that all of the results checked at the above step 207 are not normal, namely, the terminated subscriber link to be registered is not installed, the terminated subscriber link to be registered is in malfunction, the virtual path to be registered has previously been registered, or the virtual path identifier regarding the virtual path to be registered is not acceptable, then the termination processor stores the abnormal causes at step 209. Then, the termination processor notifies the corresponding origination processor at the originating site that it failed in reserved semi-permanent virtual path registration, at step 210.

In the case where it is determined it the above step 208 that the results checked at the above step 207 are all normal, the termination processor calculates an amount of band used in the terminated subscriber link at a time zone between the service start time and the service end time at step 211 to check at step 212 whether an available band amount is present in the terminated subscriber link for the reserved semi-permanent virtual path registration process. If it is checked at the above step 212 that no available band amount is present in the terminated subscriber link for the reserved semi-permanent virtual path registration process, the termination processor proceeds to the above step 209 to store the cause of "terminated subscriber link available band amount insufficiency". However, in the case where it is checked at the above step 212 that the available band amount is present in the terminated subscriber link for the reserved semi-permanent virtual path registration process, the termination processor stores information regarding a reverse connection from a terminated subscriber to an originating subscriber in a connection information management database at step 213. Then, the termination processor checks at step 214 whether the connection information stored result is normal. If it is checked at the above step 214 that the connection information stored result is not normal, the termination processor proceeds to the above step 209 to store the cause of "database connection information storage failure". However, in the case where it is checked at the above step 214 that the connection information stored result is normal, the termination processor notifies the corresponding origination processor at the originating site that the reserved semi-permanent virtual path registration process has been completed, at step 215.

Figure 9A:
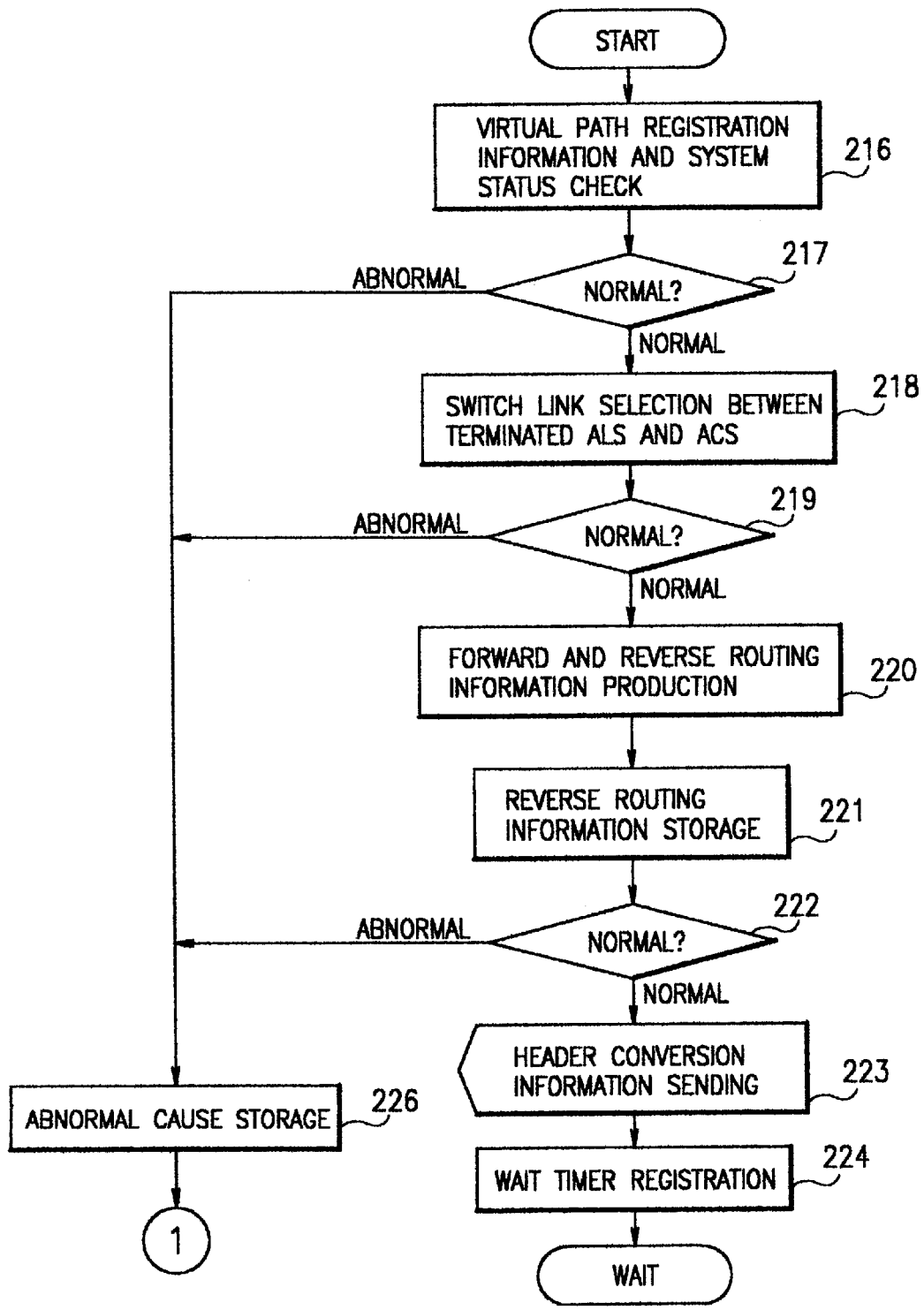
FIGS. 9A and 9B are flowcharts illustrating the operation of a termination processor in FIG. 7 for performing the reserved semi-permanent virtual path setting process in the ATM VP switching system in FIGS. 1 and 2 in accordance with the preferred embodiment of the present invention.
Figure 9B:
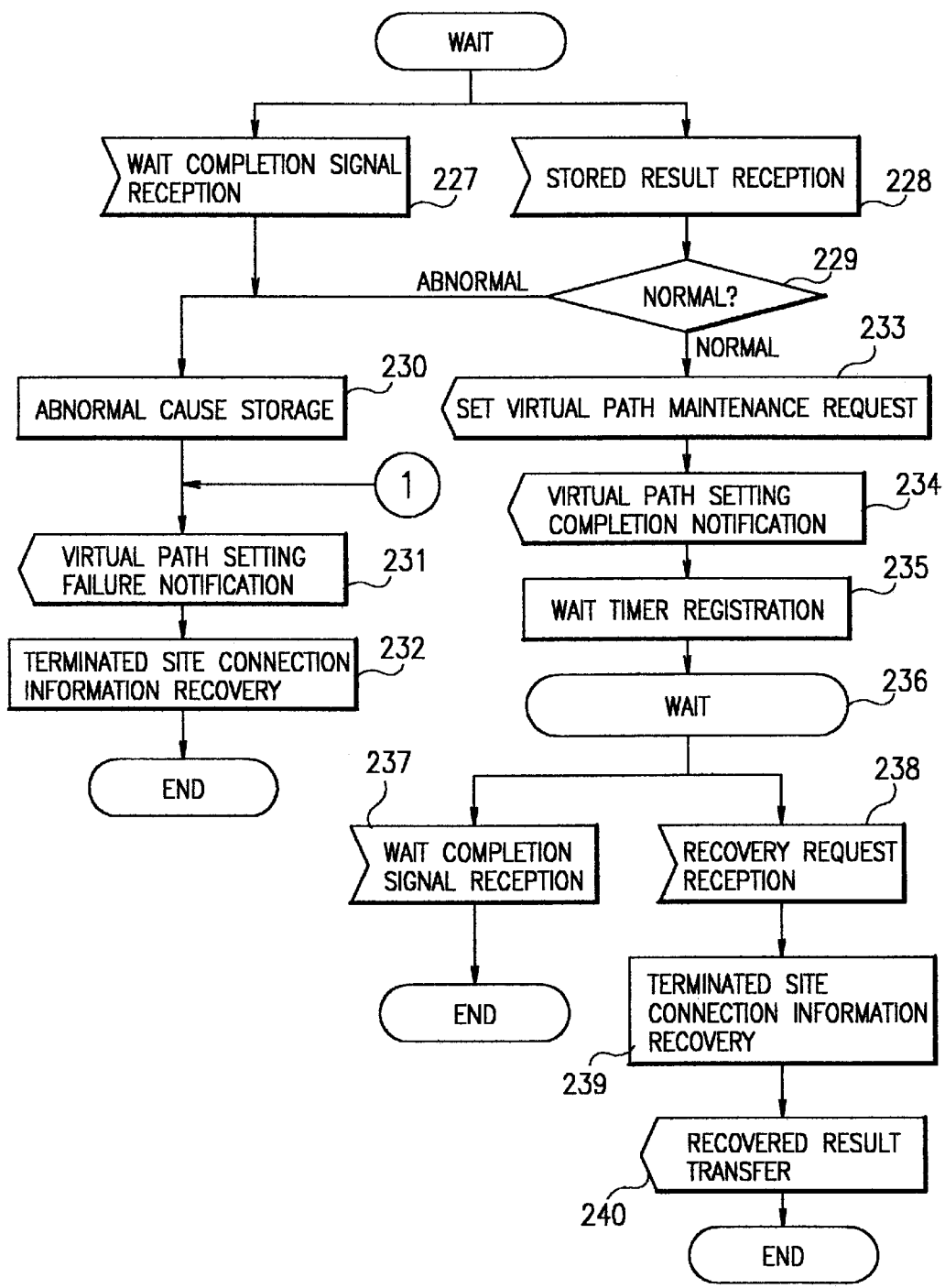

FIGS. 9A and 9B are flowcharts illustrating the operation of the termination processor in FIG. 7 for performing the reserved semi-permanent virtual path setting process in the ATM VP switching system in FIGS. 1 and 2 in accordance with the preferred embodiment of the present invention. First, in response to the reserved semi-permanent virtual path setting request from the corresponding origination processor at the originating site, the termination processor checks at step 216 whether the installation and maintenance status of a terminated originating subscriber link to be set are normal. Then, the termination processor determines at step 217 whether the results checked at the above step 216 are both normal. If it is determined at the above step 217 that both of the results checked at the above step 216 are not normal, namely, the terminated subscriber link to be set is not installed or the terminated subscriber link to be set is in malfunction, the termination processor stores the abnormal causes at step 226. Then, the termination processor processes the terminated site abnormal status, as will be mentioned later in detail.

In the case where it is determined it the above step 217 that the results checked at the above step 216 are both normal, the termination processor selects a switch link between the terminated ALS 1 and the ACS 2 at step 218 and analyzes the selected result to check whether it is normal, at step 219. If it is checked at the above step 219 that the selected result is not normal, namely, any available switch link is not present, the termination processor proceeds to the above step 226 to store the cause of "no available switch link". Then, the termination processor processes the terminated site abnormal status, as will be mentioned later in detail. However, in the case where it is checked at the above step 219 that the selected result is normal, the termination processor produces reverse routing information from a terminated subscriber to an originating subscriber and forward routing information from the originating subscriber to the terminated subscriber at step 220 and stores the produced reverse routing information in a connection information management database at step 221. Then, the termination processor checks at step 222 whether the routing information stored result is normal. If it is checked at the above step 222 that the routing information stored result is not normal, the termination processor proceeds to the above step 226 to store the cause of "database connection information storage failure". Then, the termination processor processes the terminated site abnormal status, as will be mentioned later in detail. However, in the case where it is checked at the above step 222 that the routing information stored result is normal, the termination processor sends header conversion information containing the reverse routing information and user cell monitoring information to the terminated SIM 3, at step 223. Then, the termination processor registers a wait timer at step 224 and enters a wait mode at step 225 to receive the stored result of the header conversion information from the terminated SIM 3.

If a wait completion signal is received from the registered wait timer at step 227 before the stored result of the header conversion information is received from the terminated SIM 3, the termination processor stores the cause of "terminated site routing information storage disable" at step 230. Then, the termination processor processes the terminated site abnormal status, as will be mentioned later in detail. In the case where the stored result of the header conversion information is received from the terminated SIM 3 at step 228, the termination processor analyzes the received result to check whether it is normal, at step 229. If it is checked at the above step 229 that the received result is not normal, the termination processor proceeds to the above step 230 to store the cause of "SIM routing information storage disable". Then, the termination processor processes the terminated site abnormal status, as will be mentioned later in detail. However, in the case where it is checked it the above step 229 that the received result is normal, the termination processor requests the OMCM 4 to perform the maintenance of the set semi-permanent virtual path, at step 233, and notifies the corresponding origination processor at the originating site that the reserved semi-permanent virtual path setting process has been completed, at step 234. Then, the termination processor register a wait timer at step 235 and enters a wait mode at step 236 to receive a terminated site connection information recovery request from the corresponding origination processor at the originating site.

In the case where a wait completion signal is received from the registered wait timer at step 237 before the terminated site connection information recovery request is received from the corresponding origination processor at the originating site, the termination processor recognizes that the originating site setting process has normally been completed and thus ends the operation. However, if the terminated site connection information recovery request is received from the corresponding origination processor at the originating site at step 238, the termination processor recognizes that the originating site setting process has abnormally been completed and thus recovers the terminated site connection information at step 39. Then, the termination processor transfers the recovered result of the terminated site connection information to the corresponding origination processor at the originating site at step 240 and ends the operation.

On the other hand, after the abnormal causes are stored at the above step 226 or 230, the termination processor notifies the corresponding origination processor at the originating site that it failed in reserved semi-permanent virtual path setting, at step 231. Then, the termination processor recovers the terminated site connection information at step 232 and ends the operation.

Figure 10A:
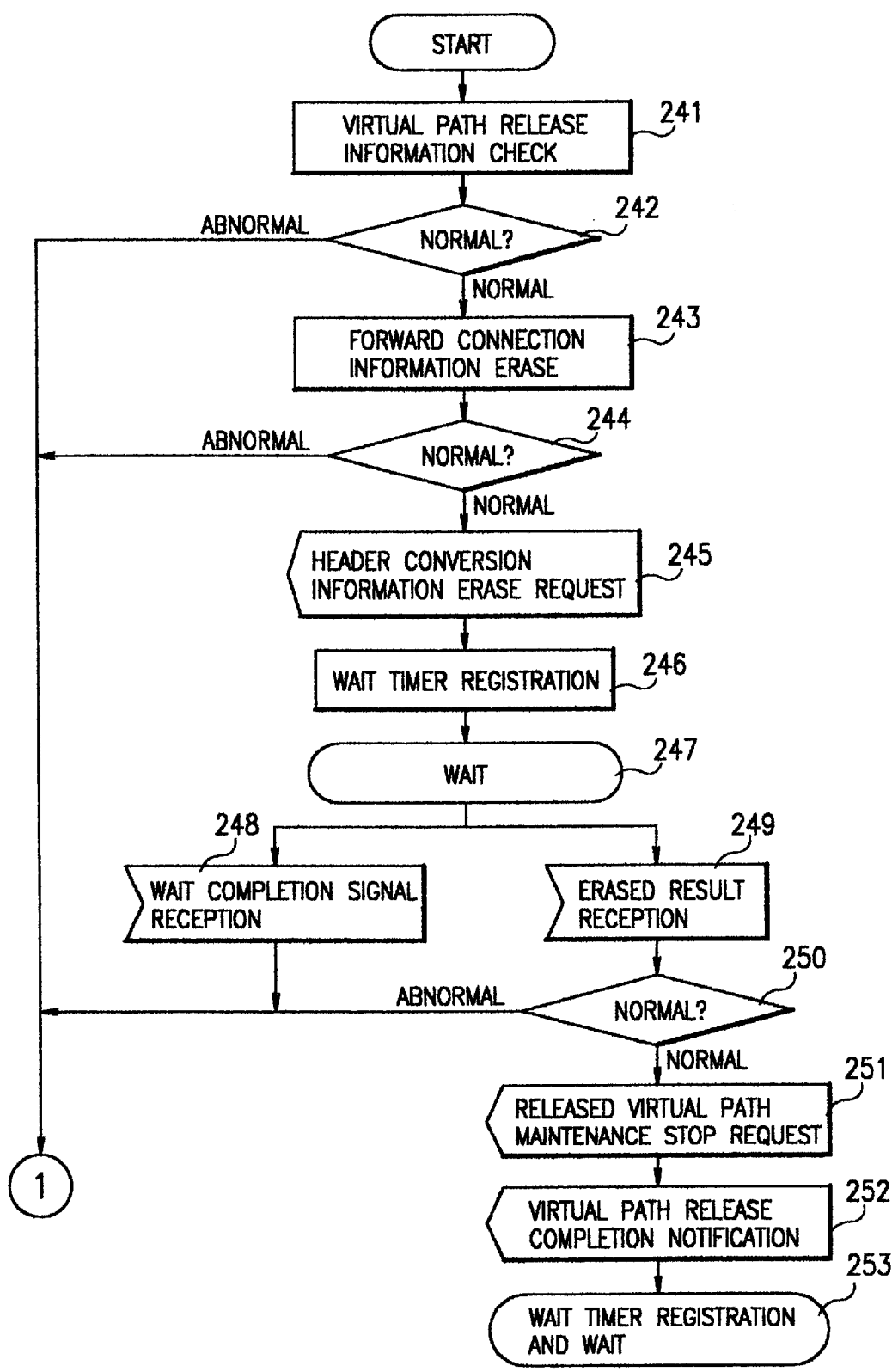
FIGS. 10A and 10B are flowcharts illustrating the operation of a termination processor in FIG. 7 for performing the reserved semi-permanent virtual path release process in the ATM VP switching system in FIGS. 1 and 2 in accordance with the preferred embodiment of the present invention.
Figure 10B:
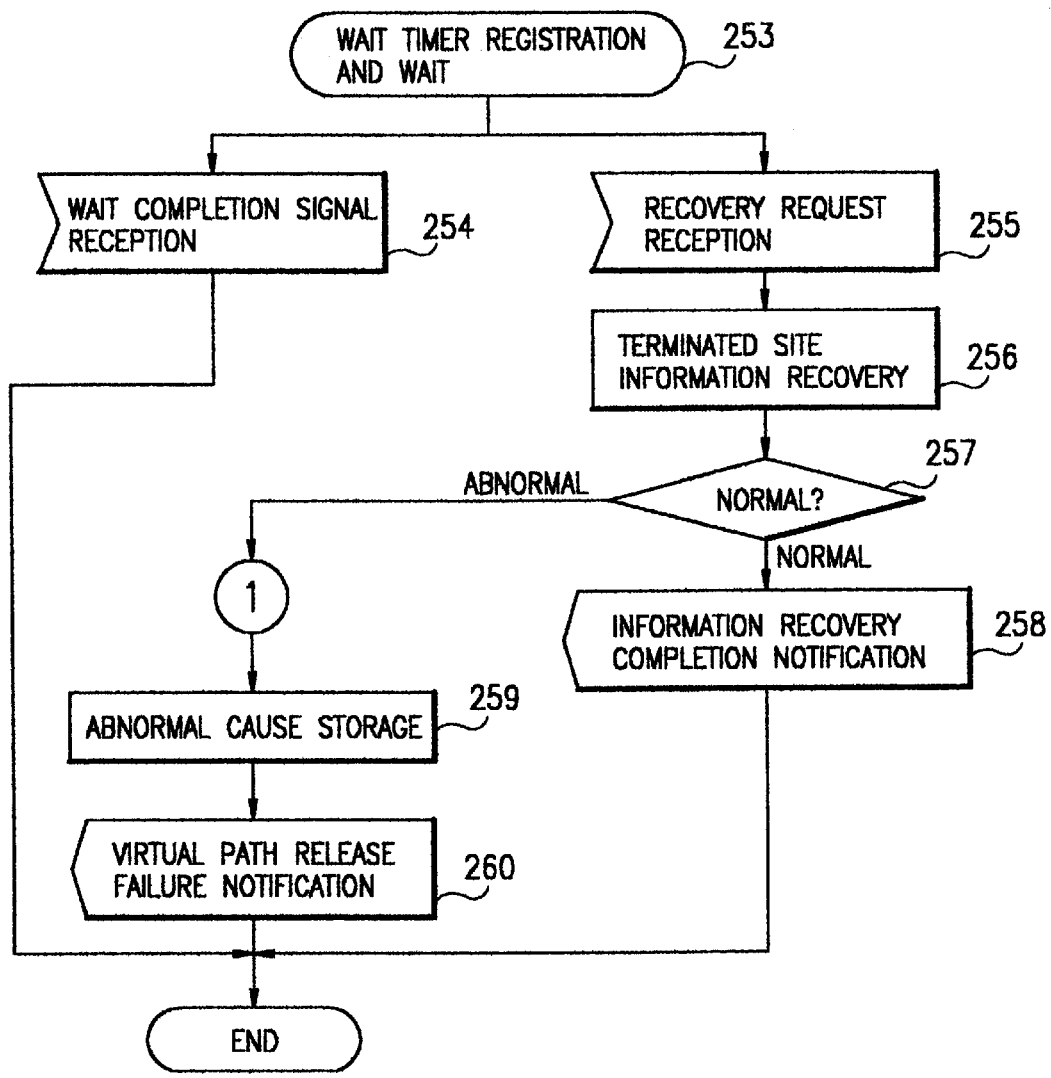

FIGS. 10A and 10B are flowcharts illustrating the operation of the termination processor in FIG. 7 for performing the reserved semi-permanent virtual path release process in the ATM VP switching system in FIGS. 1 and 2 in accordance with the preferred embodiment of the present invention. First, in response to the reserved semi-permanent virtual path release request from the corresponding origination processor at the originating site, the termination processor checks at step 241 whether the installation status of a terminated subscriber link to be released is normal and a virtual path to be released has been registered in the system. Then, the termination processor determines at step 242 whether the results checked at the above step 241 are both normal. If it is determined at the above step 242 that both of the results checked at the above step 241 are not normal, namely, the terminated subscriber link to be released is not installed, or the virtual path to be released has not been registered in the system, then the termination processor stores the cause of "no terminated subscriber link installation" or "no virtual path registration" at step 259. Then, the termination processor processes the terminated site abnormal status, as will be mentioned later in detail.

In the case where it is determined at the above step 242 that the results checked at the above step 241 are both normal, the termination processor erases information regarding a forward connection from an originating subscriber to a terminated subscriber in a connection information management database, at step 243. Also, the termination processor withdraws the occupied band amount from a link between the terminated ALS 1 aind ACS 2. Then, the termination processor checks at step 244 whether the erased result is normal. If it is checked at the above step 244 that the erased result is not normal, the termination processor proceeds to the above step 259 to store the cause of "database connection information erase failure". Then, the termination processor processes the terminated site abnormal status, as will be mentioned later in detail. However, in the case where it is checked at the above step 244 that the erased result is normal, the termination processor requests the terminated SIM 3 to erase header conversion information containing reverse routing information and user cell monitoring information, at step 245. Then, the termination processor registers a wait timer at step 246 and enters a wait mode at step 247 to receive the erased result of the header conversion information from the terminated SIM 3.

If a wait completion signal is received from the registered wait timer at step 248 before the erased result of the header conversion information is received from the terminated SIM 3, the termination processor proceeds to the above step 259 to store the cause of "terminated site routing information erase disable". Then, the termination processor processes the terminated site abnormal status, as will be mentioned later in detail. In the case where the erased result of the header conversion information is received from the terminated SIM 3 at step 249, the termination processor analyzes the received result to check whether it is normal, at step 250. If it is checked at the above step 250 that the received result is not normal, the termination processor proceeds to the above step 259 to store the cause of "SIM routing information erase disable". Then, the termination processor processes the terminated site abnormal status, as will be mentioned later in detail. However, in the case where it is checked at the above step 250 that the received result is normal, the termination processor requests the OMCM 4 to stop the maintenance of the released semi-permanent virtual path, at step 251, and notifies the corresponding origination processor at the originating site that the reserved semi-permanent virtual path release process has been completed, at step 252. Then, at step 253, the termination processor registers a wait timer and enters a wait mode to receive a terminated site information recovery request from the corresponding origination processor at the originating site.

In the case where a wait completion signal is received from the registered wait timer at step 254 before the terminated site information recovery request is received from the corresponding origination processor at the originating site, the termination processor recognizes that the originating site release process has normally been completed and thus ends the operation. However, if the terminated site information recovery request is received from the corresponding origination processor at the originating site at step 255, the termination processor recognizes that the originating site release process has abnormally been completed and thus recovers the terminated site information at step 256. Then, the termination processor analyzes the recovered result of the terminated site information to check whether it is normal, at step 257. If it is checked at the above sleep 257 that the recovered result of the terminated site information is normal, the termination processor notifies the corresponding origination processor at the originating site that the information recovery has been completed and ends the operation, at step 258.

On the other hand, if it is checked at the above step 257 that the recovered result of the terminated site information is not normal, the termination processor stores the abnormal cause at step 259. Then, the termination processor notifies the corresponding origination processor at the originating site that it failed in reserved semi-permanent virtual path release, at step 260.

As apparent from the above description, according to the present invention, the subscriber service using time is designated and the resources in the network are occupied only for the designated time. Therefore, a plurality of subscribers are set at different service time zones in such a manner that the network resources can be utilized at the maximum at each service time zone. The bidirectional-symmetrical, reserved semi-permanent virtual path is set between the subscribers interfaced through the subscriber link of 155 Mbps class, for the service provision for the designated time. Therefore, information such as a moving picture can be transferred through multimedia and virtual channel switches can be interconnected via virtual channels for the control of ATM subscribers in the future ATM network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for performing an origination process to control reserved semi-permanent virtual path connections in an asynchronous transfer mode virtual path switching system, comprising the steps of:

(a) allowing a main module at an originating site to create a virtual path registration origination processor for performing a reserved semi-permanent virtual path registration process, upon receiving a reserved semi-permanent virtual path registration request from an operator through an operation/maintenance control module, said virtual path registration origination processor checking a system status and a reserved time, requesting said operation/maintenance control module to wait for a result of the reserved semi-permanent virtual path registration process, requesting a main module at a terminated site to perform the reserved semi-permanent virtual path registration process, if an available band amount is present in an originating subscriber link for the reserved semi-permanent virtual path registration process, receiving a result of the reserved semi-permanent virtual path registration process from a virtual path registration termination processor at said terminated site, requesting said main module at said originating site to register reserved semi-permanent virtual path setting and release timers respectively indicating a service start time and a service end time, if the received result is normal, receiving a result of the reserved semi-permanent virtual path setting/release timer registration from said main module at said originating site, storing originating site connection registration information if the received result is normal and notifying said operation/maintenance control module that the reserved semi-permanent virtual path registration process has been completed;

(b) allowing said main module at said originating site to register said reserved semi-permanent virtual path setting and release timers in response to the reserved semi-permanent virtual path setting/release timer registration request from said virtual path registration origination processor;

(c) allowing said main module at said originating site to create a virtual path setting origination processor for performing a reserved semi-permanent virtual path setting process, upon receiving a reserved semi-permanent virtual path setting request from said registered virtual path setting timer, said virtual path setting origination processor checking the virtual path registration information and system status, obtaining user cell monitoring information, producing forward routing information from an originating subscriber to a terminated subscriber, requesting said main module at said terminated site to perform the reserved semi-permanent virtual path setting process, receiving a result of the reserved semi-permanent virtual path setting process from a virtual path setting termination processor at said terminated site, storing the forward routing information if the received result is normal, sending header conversion information containing the forward routing information and user cell monitoring information to an originating subscriber interface module, receiving the stored result of the header conversion information from said originating subscriber interface module, requesting said operation/maintenance control module to perform the maintenance of the set semi-permanent virtual path, if the received result is normal, and notifying said operation/maintenance control module that the reserved semi-permanent virtual path setting process has been completed; and (d) allowing said main module at said originating site to create a virtual path release origination processor for performing a reserved semi-permanent virtual path release process, upon receiving a reserved semi-permanent virtual path release request from said registered virtual path release timer, said virtual path release origination processor checking information necessary to the reserved semi-permanent virtual path release process, requesting said main module at said terminated site to perform the reserved semi-permanent virtual path release process, receiving a result of the reserved semi-permanent virtual path release process from a virtual path release termination processor at said terminated site, erasing information regarding a forward connection from the originating subscriber to the terminated subscriber, requesting said originating subscriber interface module to erase the header conversion information, receiving the erased result of the header conversion information from said originating subscriber interface module, requesting said operation/maintenance control module to stop the maintenance of the released semi-permanent virtual path, if the received result is normal, and notifying said operation/maintenance control module that the reserved semi-permanent virtual path release process has been completed.

2. A method for performing an origination process to control reserved semi-permanent virtual path connections in an asynchronous transfer mode virtual path switching system, as set forth in claim 1, wherein said virtual path registration origination processor is created at said step (a) to perform the steps of:

(a-1) checking the system status and reserved time in response to the reserved semi-permanent virtual path registration request from said operation/maintenance control module;

(a-2) storing the abnormal causes if the results checked at said step (a-1) are not normal and then notifying said operation/maintenance control module that it failed in reserved semi-permanent virtual path registration;

(a-3) requesting said operation/maintenance control module to wait for the result of the reserved semi-permanent virtual path registration process, if the results checked at said step (a-1) are normal, and calculating an amount of band used in said originating subscriber link at a time zone between the service start time and the service end time to check whether the available band amount is present in said originating subscriber link for the reserved semi-permanent virtual path registration process;

(a-4) performing said step (a-2) if it is checked at said step (a-3) that no available band amount is present in said originating subscriber link for the reserved semi-permanent virtual path registration process,) requesting said main module at said terminated site to perform the reserved semi-permanent virtual path registration process, if it is checked at said step (a-3) that the available band amount is present in said originating subscriber link for the reserved semi-permanent virtual path registration process, sending to said main module at said terminated site, a signal containing information regarding a terminated subscriber link number, a terminated virtual path identifier, a desired band amount, the service start time and the service end time necessary to the reserved semi-permanent virtual path registration process, to check whether the reserved semi-permanent virtual path registration process is enabled in a terminated link, registering a first wait timer and entering a first wait mode to receive the result of the reserved semi-permanent virtual path registration process from said virtual path registration termination processor;

(a-5) performing said step (a-2) if a wait completion signal is received from said registered first wait timer in said first wait mode, checking whether the result of the reserved semi-permanent virtual path registration process is normal, if it is received from said virtual path registration termination processor in said first wait mode, requesting said main module at said originating site to register the reserved semi-permanent virtual path setting and release timers, if it is checked that the received result is normal, registering a second wait timer and entering a second wait mode to receive the result of the reserved semi-permanent virtual path setting/release timer registration from said main module at said originating site; and (a-6) performing said step (a-2) if a wait completion signal is received from said registered second wait timer in said second wait mode, checking whether the result of the reserved semi-permanent virtual path setting/release timer registration is normal, if it is received from said main module at said originating site in said second wait mode, storing the originating site connection registration information if it is checked that the received result is normal and notifying said operation/maintenance control module that the reserved semi-permanent virtual path registration process has been completed.

3. A method for performing an origination process to control reserved semi-permanent virtual path connections in an asynchronous transfer mode virtual path switching system, as set forth in claim 1, wherein said virtual path setting origination processor is created at said step (c) to perform the steps of:

(c-1) checking the virtual path registration information and system status in response to the reserved semi-permanent virtual path setting request from said registered virtual path setting timer;

(c-2) storing the abnormal causes if the results checked at said step (c-1) are not normal, calculating the number of cells per second and a cell delay deviation to obtain the user cell monitoring information, if the results checked at said step (c-1) are normal, and checking whether a semi-permanent virtual path connection between the originating subscriber and terminated subscriber is to be made in the same asynchronous transfer mode local switching subsystems;

(c-3) producing the forward routing information from the originating subscriber to the terminated subscriber if it is checked at said step (c-2) that thief semi-permanent virtual path connection between the originating subscriber and terminated subscriber is to be made in the same asynchronous transfer mode local switching subsystems, selecting a switch link between an originating one of different asynchronous transfer mode local switching subsystems and an asynchronous transfer mode central switching subsystem if it is checked at said step (c-2) that the semi-permanent virtual path connection between the originating subscriber and terminated subscriber is to be made in the different asynchronous transfer mode local switching subsystems and analyzing the selected result to check whether it is normal;

(c-4) storing the abnormal cause if it is checked at said step (c-3) that the selected result is not normal, requesting said main module at said terminated site to perform the reserved semi-permanent virtual path setting process, if it is checked at said step (c-3) that the selected result is normal, sending to said main module at said terminated site, a signal containing information necessary to the reserved semi-permanent virtual path setting process and information regarding the selected switch link, registering a first wait timer, entering a first wait mode to receive the result of the reserved semi-permanent virtual path setting process from said virtual path setting termination processor, storing the abnormal cause if a wait completion signal is received from said registered first wait timer in said first wait mode, checking whether the result of the reserved semi-permanent virtual path setting process is normal, if it is received from said virtual path setting termination processor in said first wait mode, storing the abnormal cause if it is checked that the received result is not normal, storing the forward routing information from the originating subscriber to the terminated subscriber in a connection information management database if it is checked that the received result is normal, sending the header conversion information to said originating subscriber interface module, registering a second wait timer and entering a second wait mode to receive the stored result of the header conversion information from said originating subscriber interface module;

(c-5) storing the abnormal cause if a wait completion signal is received from said registered second wait timer in said second wait mode, checking whether the stored result of the header conversion information is normal, if it is received from said originating subscriber interface module in said second wait mode, storing the abnormal cause if it is checked that the received result is not normal, requesting said operation/maintenance control module to perform the maintenance of the set semi-permanent virtual path, if it is checked that the received result is normal, and notifying said operation/maintenance control module that the reserved semi-permanent virtual path setting process has been completed;

(c-6) notifying said operation/maintenance control module that it failed in reserved semi-permanent virtual path setting, after the abnormal causes ate stored at said steps (c-2), (c-4) and (c-5), transferring the abnormal causes to said operation/maintenance control module, recovering originating site data due to the reserved semi-permanent virtual path setting failure and checking whether the abnormal status has occurred after the terminated site process completion; and (c-7) requesting said virtual path setting termination processor to recover terminated site data, if it is checked at said step (c-6) that the abnormal status has occurred after the terminated site process completion, registering a third wait timer, entering a third wait mode to receive the recovered result of the terminated site data from said virtual path setting termination processor, outputting a data recovery failure message to said operation/maintenance control module if a wait completion signal is received from said registered third wait timer in said third wait mode, checking whether the recovered result of the terminated site data is normal, if it is received from said virtual path setting termination processor in said third wait mode, ending the operation if it is checked that the recovered result of the terminated site data is normal and outputting the data recovery failure message to said operation/maintenance control module if it is checked that the recovered result of the terminated site data is not normal.

4. A method for performing an origination process to control reserved semi-permanent virtual path connections in an asynchronous transfer mode virtual path switching system, as set forth in claim 1, wherein said virtual path release origination processor is created at said step (d) to perform the steps of:

(d-1) checking the information necessary to the reserved semi-permanent virtual path release process in response to the reserved semi-permanent virtual path release request from said registered virtual path release timer;

(d-2) storing the abnormal cause if the result checked at said step (d-1) is not normal, requesting said main module at said terminated site to perform the reserved semi-permanent virtual path release process, if the result checked at said step (d-1) is normal, sending to said main module at said terminated site, a signal containing the information necessary to the reserved semi-permanent virtual path release process, registering a first wait timer and entering a first wait mode to receive the result of the reserved semi-permanent virtual path release process from said virtual path release termination processor;

(d-3) storing the abnormal cause if a wait completion signal is received from said registered first wait timer in said first wait mode, checking whether the result of the reserved semi-permanent virtual path release process is normal, if it is received from said virtual path release termination processor in said first wait mode, storing the abnormal cause if it is checked that the received result is not normal, erasing the information regarding the forward connection from the originating subscriber to the terminated subscriber in a connection information management database if it is checked that the received result is normal, withdrawing an occupied band amount from a switch link between an originating asynchronous transfer mode local switching subsystem and an asynchronous transfer mode central switching subsystem, requesting said originating subscriber interface module to erase the header conversion information, registering a second wait timer and entering a second wait mode to receive the erased result of the header conversion information from said originating subscriber interface module;

(d-4) storing the abnormal cause if a wait completion signal is received from said registered second wait timer in said second wait mode, checking whether the erased result of the header conversion information is normal, if it is received from said originating subscriber interface module in said second wait mode, storing the abnormal cause if it checked that the received result is not normal, requesting said operation/maintenance control module to stop the maintenance of the released semi-permanent virtual path, if it is checked that the received result is normal, and notifying said operation/maintenance control module that the reserved semi-permanent virtual path release process has been completed;

(d-5) notifying said operation/maintenance control module that it failed in reserved semi-permanent virtual path release, after the abnormal causes are stored at said steps (d-2), (d-3) and (d-4), transferring the abnormal causes to said operation/maintenance control module, recovering originating site data due to the reserved semi-permanent virtual path release failure, checking whether the abnormal status has occurred after the terminated site process completion, requesting said virtual path release termination processor to recover terminated site data, if it is checked that the abnormal status has occurred after the terminated site process completion, registering a third wait timer and entering a third wait mode to receive the recovered result of the terminated site data from said virtual path release termination processor; and (d-6) outputting a data recovery failure message to said operation/maintenance control module if a wait completion signal is received from said registered third wait timer in said third wait mode, checking whether the recovered result of the terminated site data is normal, if it is received from said virtual path release termination processor in said third wait mode, ending the operation if it is checked that the received result is normal and outputting the data recovery failure message to said operation/maintenance control module if it is checked that the received result is not normal.

5. A method for performing a termination process to control reserved semi-permanent virtual path connections in an asynchronous transfer mode virtual path switching system, comprising the steps of:

(a) allowing a main module at a terminated site to create a virtual path registration termination processor for performing a reserved semi-permanent virtual path registration process, upon receiving a reserved semi-permanent virtual path registration request from a virtual path registration origination processor at an originating site, said virtual path registration termination processor checking a system status and a reserved time, calculating an amount of band used in a terminated subscriber link, storing information regarding a reverse connection from a terminated subscriber to an originating subscriber and notifying said virtual path registration origination processor that the reserved semi-permanent virtual path registration process has been completed;

(b) allowing said main module at said terminated site to create a virtual path setting termination processor for performing a reserved semi-permanent virtual path setting process, upon receiving a reserved semi-permanent virtual path setting request from a virtual path setting origination processor at said originating site, said virtual path setting termination processor checking the virtual path registration information and system status, selecting a switch link between a terminated asynchronous transfer mode local switching subsystem and an asynchronous transfer mode central switching subsystem, producing reverse routing information from the terminated subscriber to the originating subscriber and forward routing information from the originating subscriber to the terminated subscriber, storing the produced reverse routing information, sending header conversion information containing the reverse routing information and user cell monitoring information to a terminated subscriber interface module, receiving the stored result of the header conversion information from said terminated subscriber interface module, requesting an operation/maintenance control module to perform the maintenance of the set semi-permanent virtual path, if the received result is normal, and notifying said virtual path setting origination processor that the reserved semi-permanent virtual path setting process has been completed; and (c) allowing said main module at said terminated site to create a virtual path release termination processor for performing a reserved semi-permanent virtual path release process, upon receiving a reserved semi-permanent virtual path release request from a virtual path release origination processor at said originating site, said virtual path release termination processor checking information necessary to the reserved semi-permanent virtual path release process, erasing information regarding a forward connection from the originating subscriber to the terminated subscriber, requesting said terminated subscriber interface module to erase the header conversion information, receiving the erased result of the header conversion information from said terminated subscriber interface module, requesting said operation/maintenance control module to stop the maintenance of the released semi-permanent virtual path, if the received result is normal, and notifying said virtual path release origination processor that the reserved semi-permanent virtual path release process has been completed.

6. A method for performing a termination process to control reserved semi-permanent virtual path connections in an asynchronous transfer mode virtual path switching system, as set forth in claim 5, wherein said virtual path registration termination processor is created at said step (a) to perform the steps of:

(a-1) checking the system status and reserved time in response to the reserved semi-permanent virtual path registration request from said virtual path registration origination processor;

(a-2) storing the abnormal causes if the results checked at said step (a-1) are not normal and then notifying said virtual path registration origination processor that it failed in reserved semi-permanent virtual path registration;

(a-3) calculating the amount of band used in said terminated subscriber link at a time zone between a service start time and a service end time to check whether an available band amount is present in said terminated subscriber link for the reserved semi-permanent virtual path registration process, if the results checked at said step (a-1) are normal; and (a-4) performing said step (a-2) if it is checked at said step (a-3) that no available band amount is present in said terminated subscriber link for the reserved semi-permanent virtual path registration process, storing the information regarding the reverse connection from the terminated subscriber to the originating subscriber in a connection information management database if it is checked at said step (a-3) that the available band amount is present in said originating subscriber link for the reserved semi-permanent virtual path registration process and notifying said virtual path registration origination processor that the reserved semi-permanent virtual path registration process has been completed.

7. A method for performing a termination process to control reserved semi-permanent virtual path connections in an asynchronous transfer mode virtual path switching system, as set forth in claim 5, wherein said virtual path setting termination processor is created at said step (b) to perform the steps of:

(b-1) checking the virtual path registration information and system status in response to the reserved semi-permanent virtual path setting request from said virtual path setting origination processor;

(b-2) storing the abnormal causes if the results checked at said step (b-1) are not normal, notifying said virtual path setting origination processor that it failed in reserved semi-permanent virtual path setting and recovering terminated site connection information;

(b-3) selecting the switch link between said terminated asynchronous transfer mode local switching subsystem and said asynchronous transfer mode central switching subsystem if the results checked at said step (b-1) are normal, checking whether the selected result is normal, performing said step (b-2) if it is checked that the selected result is not normal, producing the reverse routing information from the terminated subscriber to the originating subscriber and the forward routing information from the originating subscriber to the terminated subscriber if it is checked that the selected result is normal, storing the produced reverse routing information in a connection information management database and checking whether the routing information stored result is normal;

(b-4) performing said step (b-2) if it is checked at said step (b-3) that the routing information stored result is not normal, sending the header conversion information to said terminated subscriber interface module if it is checked at said step (b-3) that the routing information stored result is normal, registering a first wait timer and entering a first wait mode to receive the stored result of the header conversion information from said terminated subscriber interface module;

(b-5) performing said step (b-2) if a wait completion signal is received from said registered first wait timer in said first wait mode, checking whether the stored result of the header conversion information is normal, if it is received from said terminated subscriber interface module in said first wait mode, performing said step (b-2) if it is checked that the received result is not normal, requesting said operation/maintenance control module to perform the maintenance of the set semi-permanent virtual path, if it is checked that the received result is normal, notifying said virtual path setting origination processor that the reserved semi-permanent virtual path setting process has been completed, registering a second wait timer and entering a second wait mode to receive a terminated site connection information recovery request from said virtual path setting origination processor; and (b-6) recognizing that the originating site setting process has normally been completed and thus ending the operation, if a wait completion signal is received from said registered second wait timer in said second wait mode, recognizing the originating site setting process has abnormally been completed, if the terminated site connection information recovery request is received from said virtual path setting origination processor in said second wait mode, recovering the terminated site connection information and transferring the recovered result of the terminated site connection information to said virtual path setting origination processor.

8. A method for performing a termination process to control reserved semi-permanent virtual path connections in an asynchronous transfer mode virtual path switching system, as set forth in claim 5, wherein said virtual path release termination processor is created at said step (c) to perform the steps of:

(c-1) checking the information necessary to the reserved semi-permanent virtual path release process in response to the reserved semi-permanent virtual path release request from said virtual path release origination processor;

(c-2) storing the abnormal cause if the result checked at said step (c-1) is not normal and notifying said virtual path release origination processor that it failed in reserved semi-permanent virtual path release;

(c-3) erasing the information regarding the forward connection from the originating subscriber to the terminated subscriber in a connection information management database if the result checked at said step (c-1) is normal, withdrawing an occupied band amount from the switch link between said terminated asynchronous transfer mode local switching subsystem and said asynchronous transfer mode central switching subsystem, requesting said terminated subscriber interface module to erase the header conversion information, registering a first wait timer and entering a first wait mode to receive the erased result of the header conversion information from said terminated subscriber interface module;

(c-4) performing said step (c-2) if a wait completion signal is received from said registered first wait timer in said first wait mode, checking whether the erased result of the header conversion information is normal, if it is received from said terminated subscriber interface module in said first wait mode, performing said step (c-2) if it is checked that the received result is not normal, requesting said operation/maintenance control module to stop the maintenance of the released semi-permanent virtual path, if it is checked that the received result is normal, notifying said virtual path release origination processor that the reserved semi-permanent virtual path release process has been completed, registering a second wait timer and entering a second wait mode to receive a terminated site information recovery request from said virtual path release origination processor; and (c-5) recognizing that the originating site release process has normally been completed and thus ending the operation, if a wait completion signal is received from said registered second wait timer in said second wait mode, recognizing the originating site release process has abnormally been completed, if the terminated site information recovery request is received from said virtual path release origination processor in said second wait mode, recovering the terminated site information, checking whether the recovered result of the terminated site information is normal, performing said step (c-2) if it is checked that the recovered result of the terminated site information is not normal and transferring the recovered result of the terminated site information to said virtual path release origination processor if it is checked that the recovered result of the terminated site information is normal.

\* \* \* \* \*